(12) United States Patent
Kurihara

(10) Patent No.: US 6,249,771 B1
(45) Date of Patent: *Jun. 19, 2001

(54) INFORMATION PROVIDING SYSTEM

(75) Inventor: Akira Kurihara, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/617,787

(22) PCT Filed: Jul. 26, 1995

(86) PCT No.: PCT/JP95/01491

§ 371 Date: Jun. 7, 1996

§ 102(e) Date: Jun. 7, 1996

(87) PCT Pub. No.: WO96/03818

PCT Pub. Date: Feb. 8, 1996

(30) Foreign Application Priority Data

Jul. 26, 1994 (JP) ..................................... 6-172980
Jul. 26, 1994 (JP) ..................................... 6-172982
Jul. 26, 1994 (JP) ..................................... 6-173822

(51) Int. Cl.[7] ..................................... H04H 1/08
(52) U.S. Cl. ............................................. 705/26
(58) Field of Search ........................ 705/26, 27

(56) References Cited

U.S. PATENT DOCUMENTS 5,027,400  6/1991  Baji et al. .............................. 380/20
5,032,989  *  7/1991  Tornetta ................................ 364/401

(List continued on next page.)

FOREIGN PATENT DOCUMENTS

| 0 355 697 A2 | 2/1990 | (EP) | ............................. | H04N/7/173 |
| 0 595 354 A1 | 5/1994 | (EP) | ............................. | H04N/7/16 |
| 62-105586 | 5/1987 | (JP) | ............................. | H04N/7/00 |

(List continued on next page.)

*Primary Examiner*—Robert W. Downs
(74) *Attorney, Agent, or Firm*—Frommer Lawrence & Haug, LLP; William S. Frommer; Joe H. Shallenburger

(57) ABSTRACT

An information providing system according to this invention comprises a center for providing information, and at least one terminal for accepting an offer of information from the center. The terminal comprises a first terminal side memory unit where predetermined information is recorded in advance, a unit for generating a request signal for requesting the center to transmit updating information or supplementary information with respect to the predetermined information recorded at the first terminal side memory unit, a terminal side transmitting unit for transmitting the request signal to the center, a terminal side receiving unit for receiving the updating information or the supplementary information transmitted from the center, a second terminal side memory unit for storing the received updating information or supplementary information, and a reproducing unit for reproducing the predetermined information recorded at the first terminal side memory unit, or the updating information or supplementary information stored at the second terminal side memory unit. The center comprises a center side memory unit where the updating information or the supplementary information to be offered to the terminal is stored, a center side receiving unit for receiving the request signal transmitted from the terminal, an information retrieving unit for retrieving information of the center side memory unit on the basis of the request signal to obtain updating information or supplementary information requested on the terminal side, and a center side transmitting unit for transmitting, to the terminal, the updating information or the supplementary information obtained by the information retrieving unit.

17 Claims, 23 Drawing Sheets

U.S. PATENT DOCUMENTS

| | | | | |
|---|---|---|---|---|
| 5,410,598 | * | 4/1995 | Shear | 380/4 |
| 5,509,070 | * | 4/1996 | Schull | 380/4 |
| 5,528,490 | * | 6/1996 | Hill | 364/403 |
| 5,689,648 | * | 11/1997 | Diaz et al. | 395/226 |
| 5,694,546 | * | 12/1997 | Reisman | 395/200.9 |
| 5,761,649 | * | 6/1998 | Hill | 705/27 |

FOREIGN PATENT DOCUMENTS

| | | | | |
|---|---|---|---|---|
| 63-176077 | | 7/1988 | (JP) | H04N/7/173 |
| 63-240285 | | 10/1988 | (JP) | H04N/7/173 |
| 2-54646 | | 2/1990 | (JP) | H04L/12/00 |
| 2-249187 | * | 10/1990 | (JP) | G11B/27/10 |
| 3-114348 | | 5/1991 | (JP) | H04M/11/00 |
| 3-239292 | * | 10/1991 | (JP) | G10H/1/00 |
| 3-254488 | | 11/1991 | (JP) | G11B/27/10 |
| 4-32898 | * | 2/1992 | (JP) | G10K/15/04 |
| 5-235878 | | 9/1993 | (JP) | H04H/1/02 |
| 6-152550 | | 5/1994 | (JP) | H04H/1/02 |

* cited by examiner

DIRECTORY OF TERMINAL MANAGEMENT

| TERMINAL ID | REGISTERED TELEPHONE NO. | CHARGING INFORMATION | UPDATING DATE |
|---|---|---|---|
| TERMINAL ID | REGISTERED TELEPHONE NO. | CHARGING INFORMATION | UPDATING DATE |
| | | | |

FIG.11

MANAGEMENT INFORMATION OF
MUSICAL INSTRUMENT INFORMATION
(DIRECTORY)

| INFORMATION ID | MUSIC INFORMATION | CHARGING INFORMATION | REGISTERED DATE | STORAGE POSITION INFORMATION |
|---|---|---|---|---|
| INFORMATION ID | MUSIC INFORMATION | CHARGING INFORMATION | REGISTERED DATE | STORAGE POSITION INFORMATION |
| | | | | |

| INFORMATION ID | TOTAL NO. OF ACCESS OPERATIONS | ACCESS DISTRIBUTION | | | | | | | |
|---|---|---|---|---|---|---|---|---|---|
| | | SEX | | AGE | | | | | |
| | | MEN | WOMEN | LESS THAN 20 | 21~30 | 31~40 | 41~50 | 51~60 | 61 OR MORE |
| a-1 | 150 | 100 | 50 | 5 | 15 | 70 | 40 | 10 | 10 |
| a-2 | 50 | 0 | 50 | 30 | 15 | 5 | 0 | 0 | 0 |
| ﹍ | ﹍ | ﹍ | ﹍ | ﹍ | ﹍ | ﹍ | ﹍ | ﹍ | ﹍ |

| USER | | PERSONAL CHARACTERISTIC INFORMATION | | | | ACCESS PAST RECORD INFORMATION | | | | | |
|---|---|---|---|---|---|---|---|---|---|---|---|
| NAME | ID | SEX | AGE | OCCUPA-TION | ADDRESS | CREDIT No. | TOTAL ACCESS TIME | TOTAL NO. OF ACCESS OPERATIONS | ACCESS LOG | | |
| | | | | | | | | | INFOR-MATION ID | NO. OF ACCESS OPERATIONS | ACCESS DATE | ACCESS TIME |
| A | 001 | MAN | 35 | COMPANY EMPLOYEE | TOKYO | ***** | 2 : 50 | 5 | a-1 | 2 | 4/3 19:30<br>4/10 18:00 | 0 : 45<br>0 : 30 |
| | | | | | | | | | b-1<br>b-2<br>b-3 | 0<br>0<br>1 | 4/18 21:00 | 0 : 15 |
| | | | | | | | | | c-1 | 0 | | |
| | | | | | | | | | d-1 | 1 | 4/5 16:30 | 1 : 00 |
| | | | | | | | | | e-1 | 0 | | |
| | | | | | | | | | f-1<br>f-2 | 0<br>1 | 4/21 20:10 | 0 : 20 |

PERSONAL ACCESS MANAGEMENT INFORMATION

FIG.19

INFORMATION PROVIDING SYSTEM

TECHNICAL FIELD

This invention relates to an information providing system, and more particularly to an information providing system comprising a center for providing information of image, music or mail order sale (video shopping), etc., and a plurality of terminals for accepting offer of information from the center.

BACKGROUND ART

A conventional information providing system comprises a center (service providing unit) for collecting information from plural information providing persons (providers) to provide information to users, and a plurality of terminals (user terminals) for accepting offer of information from the center. The center and the terminals are connected (coupled) through, e.g., telephone lines to take out, from data base of the center, information that user, i.e., the terminal side desires.

In the system of this kind, retrieval and reception of information required on the terminal side are carried out by making reference to the content indication (directory information) of information delivered from the center side to the terminal side in the state where the line is connected. Such data base system or personal communication system, etc. is suitable for information providing service for taking out information having relatively small information quantity and no limitation in the information transfer rate (speed) like text information.

However, in the case of information having vast quantity of information such as image or music, etc., there was the problem that it takes time more than the actual time because there exists limitation based on the information transmission rate (speed) of the line, so the line cost would be increased.

Moreover, if an approach is employed to utilize broadcasting (network) as the transmission media for information, the transmission rate (speed) is increased so that transmission of information is facilitated. However, there was the problem that because transmission is conducted in unidirectional fashion, in the case where an attempt is made to update information which has been sent once, it is required to send the entirety thereof for a second time. In addition, since relevancy to information which has been already sent cannot be obtained, updating of partial information was impossible in practice.

On the other hand, as means for offering (providing) vast information such as image or music, etc. to user, there is CD-ROM, etc. Large capacity recording media like CD-ROM are offered from a providing person (provider) to users by physical distribution. However, since writing with respect to the recording medium is impossible, there was the problem that, also in updating partial information, the recording medium (CD-ROM) itself must be newly exchanged.

Moreover, in recent years, so called Musical Instrument Communications in which musical instrument information consisting of image and music is transmitted from the center to the terminal every time by using ISDN (Integrated Services Digital Network) line as a MIDI (Musical Instrument Digital Interface) signal are being developed. However, there is the problem that the line connection fee would become high.

Meanwhile, also in the case of collecting, at the center, information from a plurality of information providers as described above, the information providing units of the information provider side and the center of the service provider side are connected by way of communication lines to carry out transmission of information. In such a transmission, a plurality of information providers transmit respective information to the service provider. Thus, the service provider stores these information and carries out management thereof at the center. User operates the terminal to thereby provide an access to the center to receive desired information.

Moreover, the center totalizes the number of access operations every user to transmit the number of access operations to the terminal when there is request from the user. The terminal displays, by figures, the number of access operations which has been transmitted. Thus, the user can confirm, e.g., the number of access operations and/or the fee of information.

Further, the center totalizes the number of utilization operations of user every information provided by each information provider to notify the information providing unit of the number of utilization operations of corresponding information. Thus, the information provider carries out charging (processing) with respect to the user from the number of utilization operations.

However, in the conventional information providing systems, since the center only carries out totalization processing to such an degree of the numbers of access operations every respective users and the numbers of utilization operations every respective information, e.g., the information provider can recognize the number of utilization operations of information that he has offered, but could not recognize utilization frequency with respect to total information caused to undergo management by the center. In addition, user can recognize the number of the own utilization operations, but could not recognize what information is utilized more frequently by other users. Namely, the user could not recognize hit chart of information.

On the other hand, in the case of providing information by making use of broadcasting or CD-ROM, it is impossible in a realistic sense that the information provider obtains access management information including access past record, etc. indicating access situations, e.g., the number of access operations and/or access date, etc. The management information referred to here is information obtained by processing access past record, e.g., every sex (men, women), every name, every age or every data. In addition, the information provider could not offer access situations of all users to those users.

This invention has been made in view of actual circumstances with conventional information providing systems as described above, and its object is to provide an information providing system in which information ordinarily required are preserved (stored) in such a form recorded with respect to a recording medium like CD-ROM to take only information newly required or information to be updated from the center into the terminal through wire communication line such as cable, etc., or satellite (wireless) channel (network), thereby making it possible to reduce the running cost such as line (channel) connection fee, etc. and to efficiently take out desired information at the terminal.

Another object of this invention is to provide an information providing system which can provide totalization (totalized) result corresponding to needs of the user and/or the information provider.

A further object of this invention is to provide an information providing system capable of efficiently obtaining access management information indicating access situations every information offered (provided) to users by the information provider.

A still further object of this invention is to provide an information providing system which can offer access situations of all users to a certain user in a form such that he is easy to see.

DISCLOSURE OF THE INVENTION

An information providing system according to this invention comprises a center for providing information, and at least one terminal for accepting an offer of information from the center. The terminal comprises first terminal side memory where predetermined information is recorded in advance, generator which generates a request signal for requesting the center to transmit updating information or supplementary information with respect to the predetermined information recorded at the first terminal side memory, terminal side transmitter means for transmitting the request signal to the center, terminal side receiver for receiving the updating information or the supplementary information transmitted from the center, second terminal side memory for storing the updating information or the supplementary information which has been received, and reproducer for reproducing the predetermined information recorded at the first terminal side memory means and the updating information or the supplementary information stored at the second terminal side memory. The center comprises center side memory where the updating information or the supplementary information to be offered (provided) to the terminal is stored, center side receiving for receiving the request signal transmitted from the terminal, information retrieving for retrieving information stored at the center side memory on the basis of the request signal to obtain updating information or supplementary information requested on the terminal side, and center side transmitter for transmitting, to the terminal, the updating information or the supplementary information obtained by the information retriever.

Moreover, an information providing system according to this invention comprises a center for providing information, and at least one terminal for accepting an offer of information from the center. The terminal comprises request signal generator which generates a desired information request signal for requesting the center to transmit desired information, terminal side transmitter for transmitting the desired information request signal to the center, terminal side receiver for receiving desired information corresponding to the desired information request signal which has been transmitted from the center, and display for displaying the received desired information. The center comprises center side receiver for receiving the desired information request signal transmitted from the terminal, provided information memory in which information to be offered (provided) to the terminal is stored, desired information retrieving means for extracting information corresponding to the desired information request signal from the provided information memory, totalizing means for totalizing the number of access operations by the terminal with respect to the information stored in the provided information memory to generate totalized information, totalized information memory for storing the totalized information, and center side transmitting means for transmitting the extracted desired information to the terminal. Further, the terminal comprises generator which generates a hit chart information request signal for requesting the center to transmit hit chart information indicating frequency of utilization operations of information. The terminal side transmitter transmits the hit chart information request signal to the center. The center side receiver receives the hit chart information request signal. Further, the center comprises processing for reading out the totalized information from the totalized information memory in correspondence with the hit chart information request signal to process it into hit chart information. The center side transmitter transmits the hit chart information to the terminal.

In addition, an information providing system according to this invention comprises a center for providing information, and at least one terminal for accepting an offer of information from the center. The terminal comprises terminal side memory where predetermined information and directory information of the predetermined information are stored in advance, reader for reading out corresponding directory information in accordance with an access designation (instruction) of user with respect to the predetermined information to generate access management information including information relating to past record of access with respect to the predetermined information, updater for updating the access management information every time access with respect to the predetermined information is carried out, and terminal side transmitter for transmitting the updated access management information to the center. The center comprises center side receiver for receiving the access management information which has been transmitted from the terminal, center side memory means for storing the access management information in a manner caused to be in correspondence with user ID for identifying user, and charger for carrying out charging processing with respect to the user on the basis of the access management information stored at the center side memory.

BRIEF DESCRIPTION OF THE DRAWINGS

FIG. 11 is a diagram showing arrangement state of directory information for terminal management used in this invention.

FIG. 12 is a diagram showing arrangement state of management information of musical instrument information used in this invention.

FIG. 18 is a view showing totalization of the total number of access operations, etc.

FIG. 19 is a view showing good sale/buying sentiment information.

BEST MODE FOR CARRYING OUT THE INVENTION

Preferred embodiments of an information providing system according to this invention will now be described with reference to the attached drawings.

Figure 1:
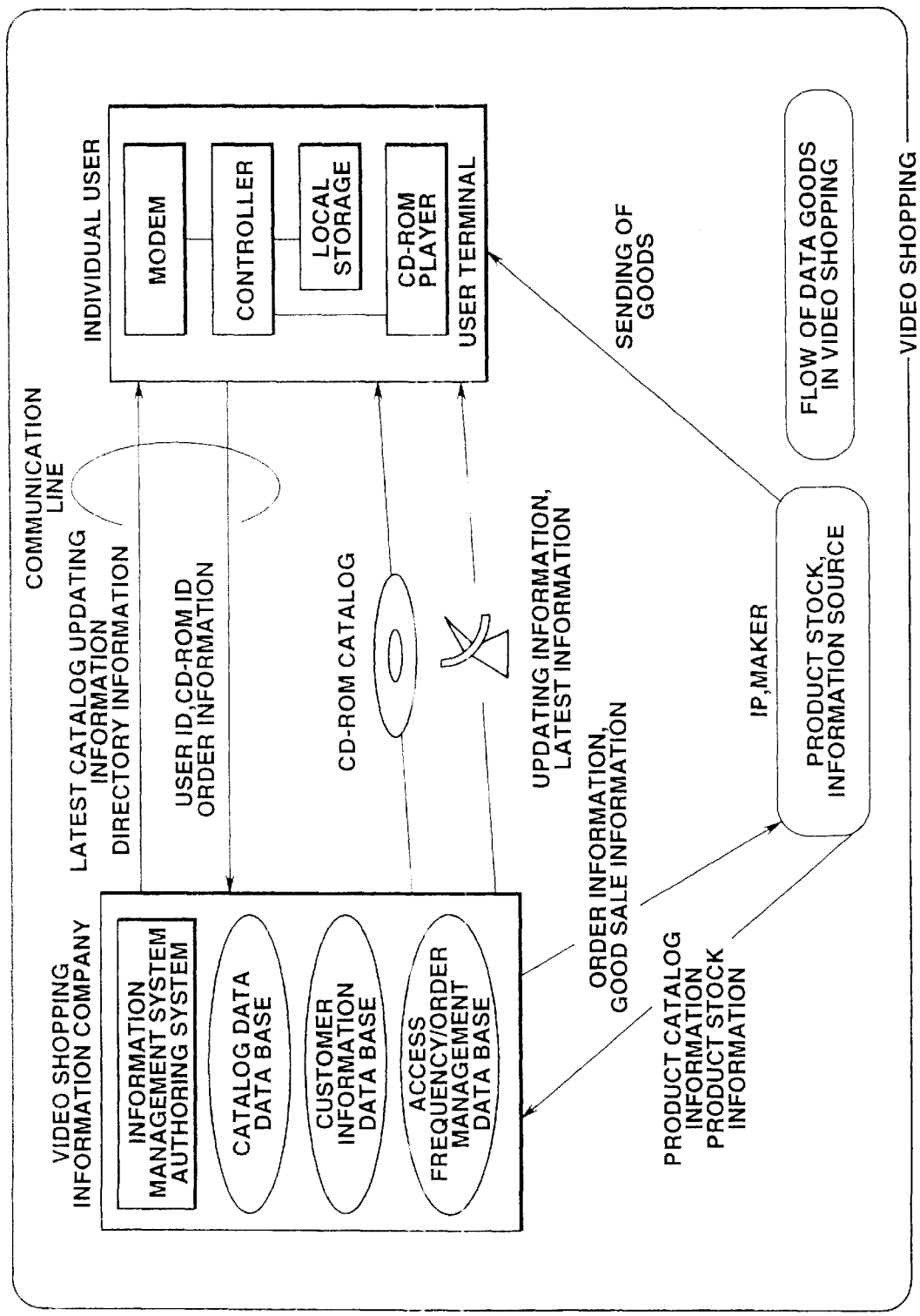
FIG. 1 is a conceptual view for explaining physical distribution and flow of information of an information providing system of this invention.

Initially, e.g., flow of information in the video shopping will be described below. FIG. 1 is a conceptual diagram showing flow of information in the video shopping. In the FIG. 1 mentioned above, the video shopping information providing company constructs the information management system and the authoring system, and includes catalog database, customer information data base, and access frequency/order management data base. The terminal that user such as individual user, etc. has is provided with equipments required for communication of information and information access such as modem, controller, local storage, and CD-ROM player, etc.

The video shopping information providing company distributes CD-ROM on which catalog information is recorded to user through a circulation route. Further, the video shopping information providing company sends latest information and/or updating information to the user terminal through a communication line or the satellite (network) channel. On the other hand, the user reads out catalog information from the CD-ROM by using the terminal to send order information, etc. to the video shopping information providing company through the communication line on the basis of such information. Maker, etc. sends goods to the user on the basis of the order information sent from the video shopping information providing company.

A more practical configuration of the information providing system to which this invention is applied will now be described.

Figure 2:
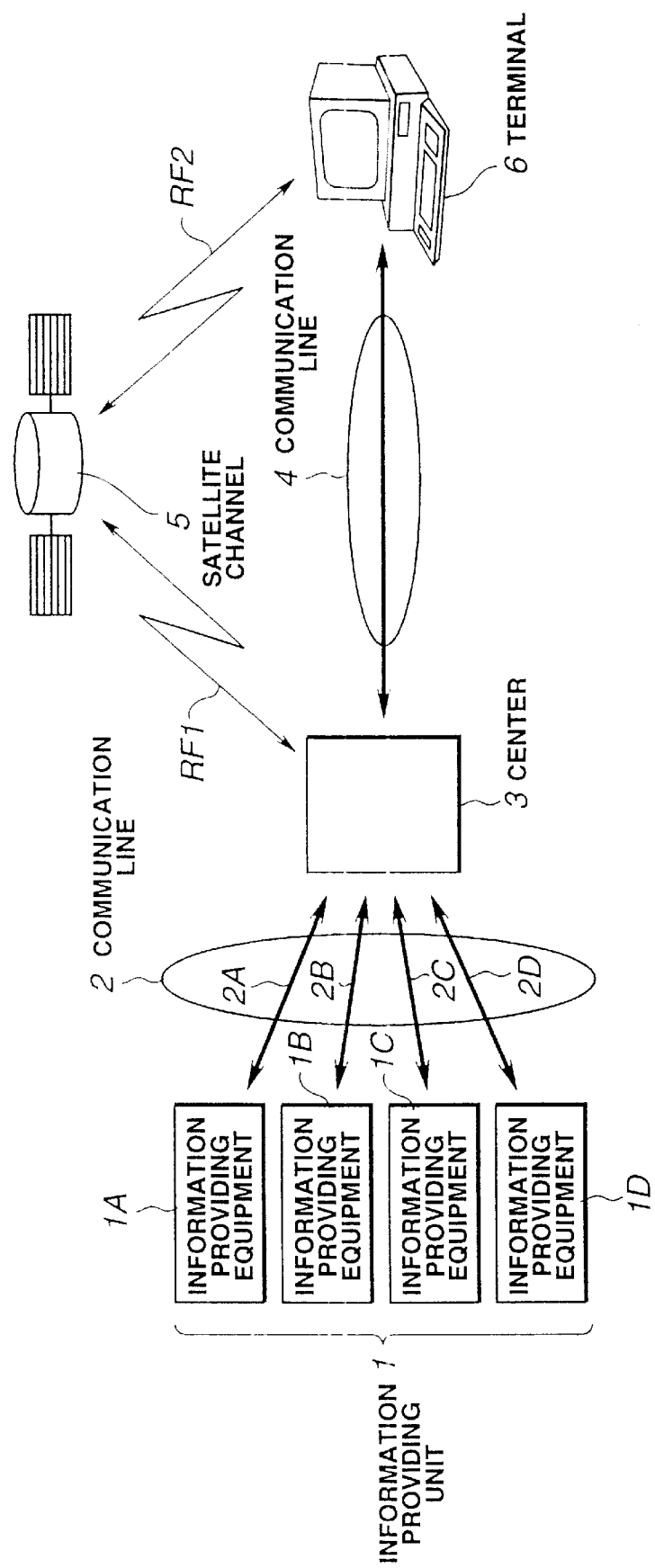
FIG. 2 is a view showing the configuration of an embodiment of this invention.

This information providing system includes, as shown in FIG. 2, for example, an information providing unit 1 (1A to 1D) provided on the respective information provider side for delivering, to a center 3, information to be supplied to a terminal 6 which will be described later, the center 3 for storing various kinds of information from the information providing equipments 1A to 1D and carrying out management thereof, and for delivering, to the terminal 6, updating information and/or supplementary information which will be described later that the terminal 3 needs, and the terminal 6 for receiving information from the center 3, and for reproducing information recorded on a recording medium provided therewithin along with received information.

Figure 3:
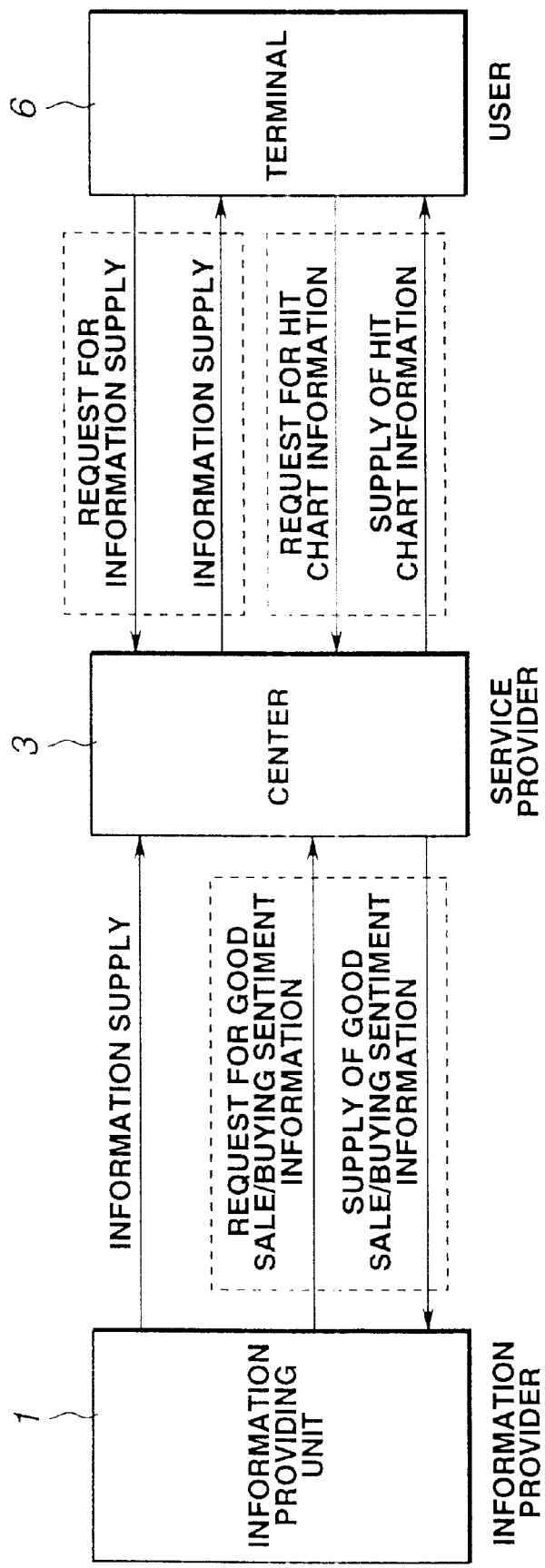
FIG. 3 is a view showing transmission and reception of information between information providing unit 1, center 3 and terminal 6 shown in FIG. 2.

Further, in this information providing system, the information providing equipments 1A to 1D and the center 3 are connected (interconnected) by way of communication lines 2A to 2D of, e.g., integrated digital communication service (ISDN), etc. For example, as shown in FIG. 3, the information providing equipments 1A to 1D delivers, to the center 3, various information, e.g., on line shopping catalog information, music information or game software, etc. The center 3 delivers, to the information providing unit 1, marketing information indicating good sale information or buying sentiment information.

Moreover, in this information providing system, the center 3 and the terminal 6 are connected by way of a communication line 4 such as analog telephone line or ISDN line, or satellite channel (network) 5. For example, as shown in the FIG. 3 mentioned above, the center 3 delivers, to the terminal 6, updating information or supplementary information with respect to information recorded on a recording medium that the terminal 6 has, and delivers, to the terminal 6, e.g., hit chart of information indicating what information is utilized more frequently by other users. It is to be noted that while four information providing equipments 1A to 1D are indicated in the FIG. 2 mentioned above, an arbitrary number of information providing equipments are connected to the center 3 in practice. In addition, while only one terminal 6 is indicated, a large number of terminals are connected in practice.

Figure 4:
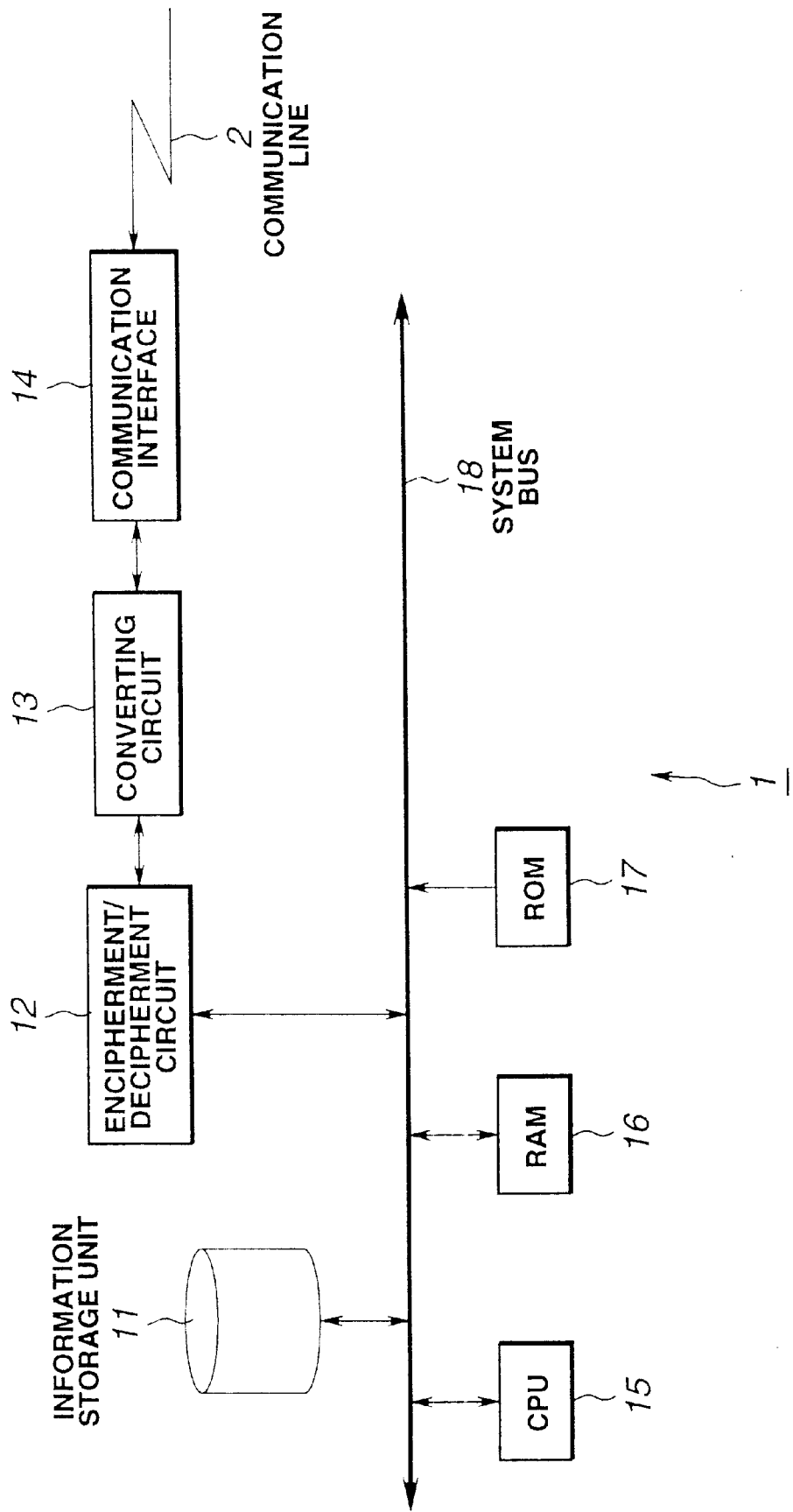
FIG. 4 is a view showing an example of the configuration of the information providing unit 1 of FIG. 2.

In more practical sense, the information providing unit 1 comprises, as shown in FIG. 4, for example, an information storage unit 11 on which information that the information providing unit 1 provides is stored, an encipherment/decipherment circuit 12 for enciphering information which has been read out from the information storage unit 11, and deciphering (decoding) the received enciphered information, a converting circuit 13 for converting the enciphered information from the encipherment/decipherment circuit 12 into information of the data format corresponding to the communication line 2, a communication interface 14 for outputting information from the converting circuit 13 to the communication line 2, and for receiving information from the communication line 2, a central Processing Unit (hereinafter simply referred to as CPU) 15 for controlling the entirety of the information providing unit 1, a RAM 16 for temporarily storing operation result at the CPU 15, and a ROM 17 in which control program, etc. that the CPU 15 executes is stored. Moreover, the CPU 15, the information storage unit 11, the encipherment/decipherment circuit 12, the ROM 17 and the RAM 16 are connected (interconnected) by way of a system bus 18 consisting of, e.g., data bus, address bus and control bus, etc.

More particularly, the information storage unit 11 is comprised of a recording medium, e.g., magnetic tape, magnetic disc, optical disc or magneto-optical disc, etc.

Information e.g., on line shopping catalog information, music information or game software, etc. that the information providing unit 1 provides are stored on the information storage unit 11.

The ROM 17 stores therein control program that the CPU 15 executes and management information for carrying out management of the information storage unit 11 (information indicating hardware specification, e.g., size of volume (capacity), etc.). Moreover, the RAM 16 temporarily stores current state of the information providing unit 1, i.e., operation result in a certain operation processing process.

The CPU 15 executes the control program stored in the ROM 17 to control the entirety of the information providing unit 1 through the system bus 18 to thereby read out information such as on line shopping catalog information, music information or game software, etc. stored on the information storage unit 11 to deliver it to the center 3, and to request the center 3 to transmit marketing information. The detail of the request for marketing information will be described later.

The encipherment/decipherment circuit 12 enciphers information which has been read out from the information storage unit 11 to deliver it to the converting circuit 13, and to decipher (decode) the enciphered marketing information, etc. received from the center 3 to output it to the system bus 18.

The converting circuit 13 converts information sent out from the information providing unit 1 into information of the data format corresponding to the communication line 2 to deliver it to the communication interface 14, and to implement conversion processing opposite to the above to the received information to deliver it to the encipherment/decipherment circuit 12.

The communication interface 14 is connected to the center 3 through the communication line 2, and is adapted to modulate the format converted information from the converting circuit 13 in accordance with a predetermined modulation system to transmit a modulated signal thus obtained to the center 3 through the communication line 2, and to receive and demodulate the modulated signal sent from the center 3 to deliver it to the converting circuit 13.

Thus, transmission of information offered (provided) to the terminal 6 is carried out from the information providing unit 1 to the center 3, and reception of marketing information from the center 3 is carried out.

Explanation will now be given in connection with more practical configuration of the center 3 and the terminal 6 in the case where the communication line 4 is used as a transmission medium for carrying out transmission/reception of information between the center 3 and the terminal 6.

Figure 5:
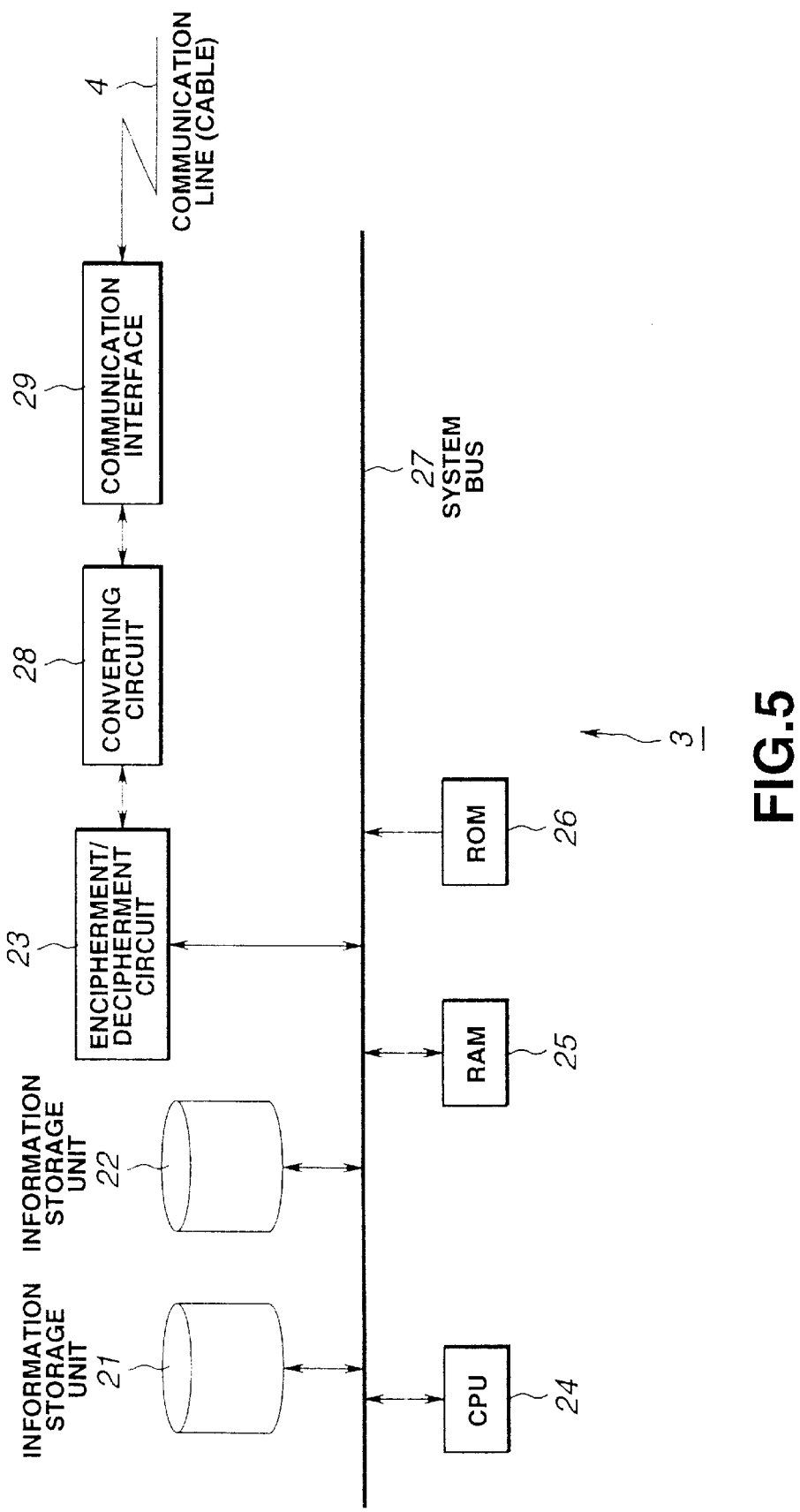
FIG. 5 is a block diagram showing the configuration of a first embodiment of the center side according to the information providing system of this invention.

The center 3 comprises, as shown in FIG. 5, for example, an information storage unit 21 where information to be offered (provided) to the respective terminals 6 are stored, an information storage unit 22 for storing charging information every user, past record information for updating, and telephone numbers of users, etc., an encipherment/decipherment circuit 23 for enciphering information which has been read out from the information storage unit 21, a CPU 24 for executing control program, a RAM 25 for temporarily storing, e.g., operation result, etc. in the operation processing process of the CPU 24, a ROM 26 in which control program of the CPU 24 and management information indicating hardware specification, e.g., size of capacity etc. of the information storage unit 21 is stored, a converting circuit 28 for converting enciphered information from the encipherment/decipherment circuit 23 into information of the data format corresponding to the communication line 4, and a communication interface 29 for outputting information from the converting circuit 28 to the communication line 4, and for receiving information from the communication line 4.

Moreover, the CPU 24, the information storage units 21, 22, the encipherment/decipherment circuit 23, the ROM 26 and the RAM 25 are connected to each other (interconnected) by way of a system bus 27 consisting of, e.g., data bus, address bus and control bus, etc.

Figure 6:
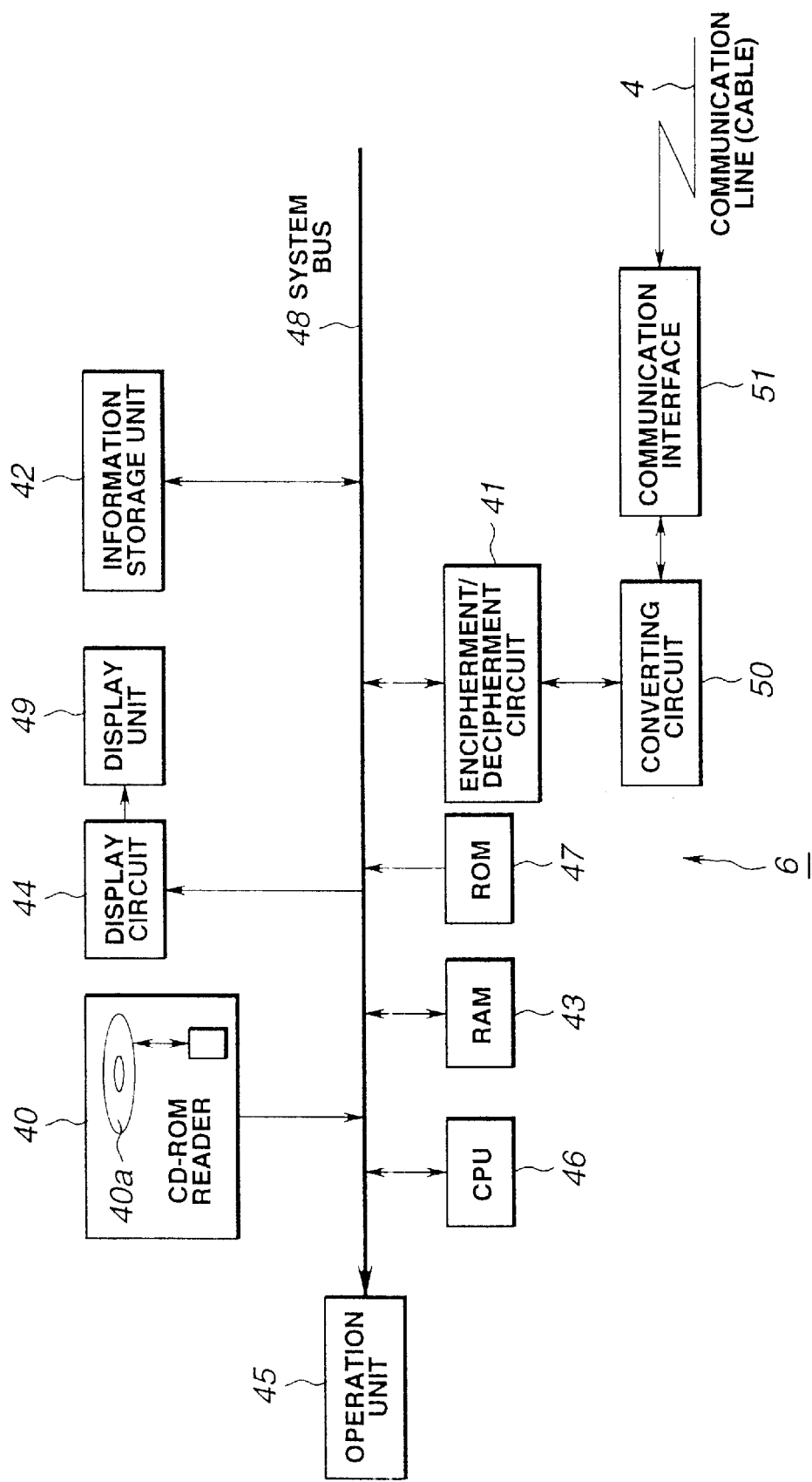
FIG. 6 is a block diagram showing the configuration of a first embodiment of the terminal side according to the information providing system of this invention.

On the other hand, the terminal 6 comprises, as shown in FIG. 6, for example, a CD-ROM Reader 40 for reading information from a recording medium on which information is recorded in advance, e.g., CD-ROM 40a, an encipherment/decipherment circuit 41 for deciphering (decoding) the enciphered information received from the center 3 and for enciphering information transmitted to the center 3, an information storage unit 42 for preserving (storing) information deciphered (decoded) by the encipherment/decipherment circuit 41, a display circuit 44 for converting information stored in the information storage unit 42 into display character information, etc., an operation unit 45 for operating the terminal 6, a CPU 46 for executing control program, a RAM 43 for temporarily storing, e.g., operation result, etc. in the operation processing process of the CPU 46, a ROM 47 in which control program that the CPU 46 executes and management information for the terminal 6 including information relating to terminal ID and/or ability of the terminal are stored, a display unit 49 for displaying picture image based on character information, etc., delivered from the display circuit 44, a converting circuit 50 for converting enciphered information from the encipherment/decipherment circuit 23 into information of the data format corresponding to the communication line 4, and a communication interface 51 for outputting information from the converting circuit 50 to the communication line 4, and for receiving information from the communication line 4.

Moreover, the CPU 46, the CD-ROM reader 40, the information storage unit 42, the encipherment/decipherment circuit 41, the ROM 47 and the RAM 43 are connected to each other (interconnected) by way of a system bus 48 consisting of, e.g., data bus, address bus and control bus, etc.

Further, the center 3 and the terminal 6 are connected by way of the communication line 4 in which wire communication path, e.g., ISDN line, analog telephone line, etc. or ground wave radio (wireless) communication path (channel) is employed as transmission medium, and are adapted to transmit, to the terminal 6 through the communication line 4, information relating to new information or updating information required at the terminal 6, i.e., new information except for the information recorded on the CD-ROM 40a or information which requires updating of the information recorded on the CD-ROM 40a.

Figure 7:
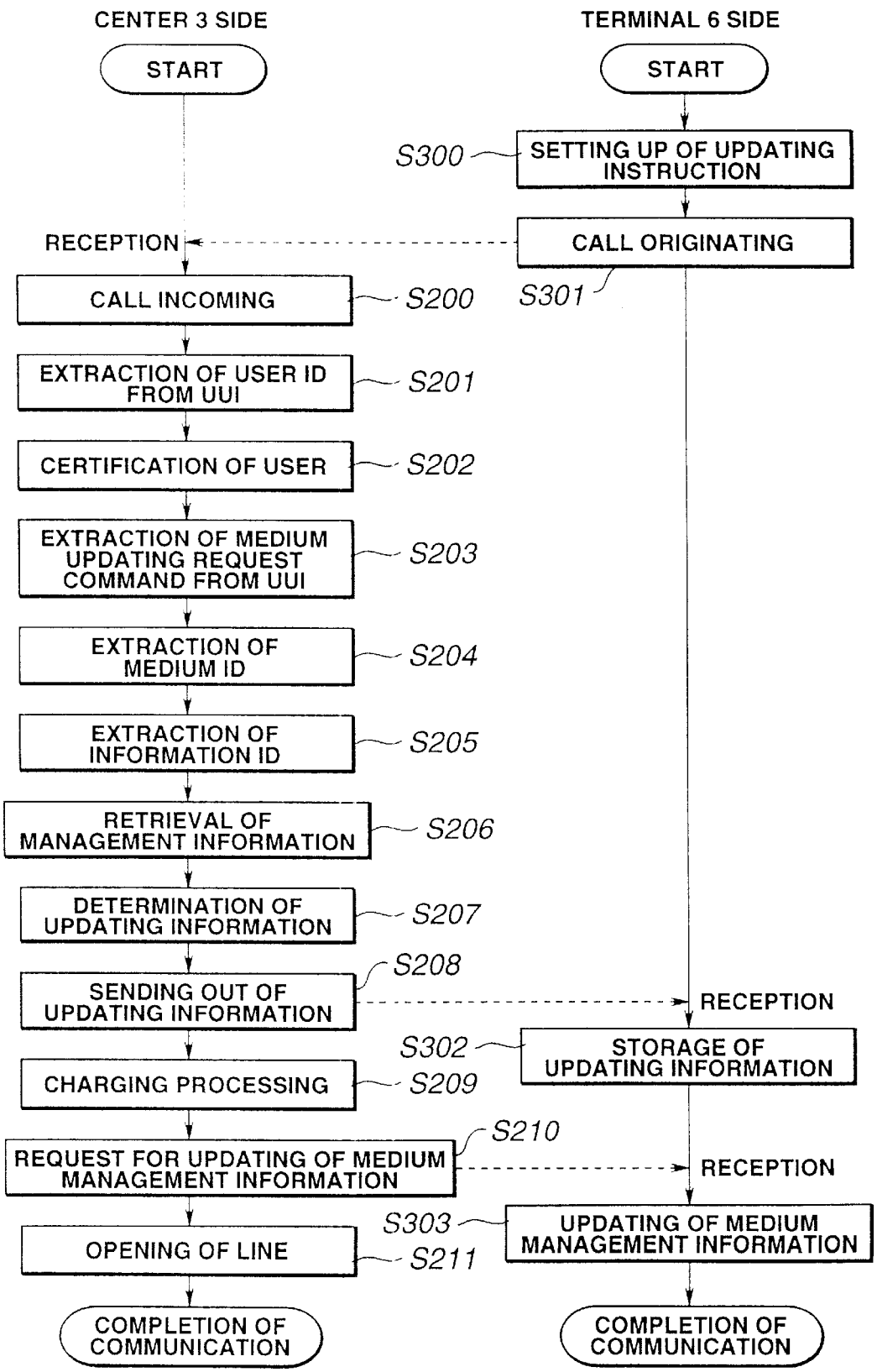
FIG. 7 is a flowchart showing operations at the center and the terminal shown in FIGS. 5 and 6.

The operation for selectively supplementing such new information or updating information from the center 3 to the terminal 6 will now be described. FIG. 7 is a flowchart showing the operation in the case of requesting the center 3, via the communication line 4, from the terminal 6 to transmit new information except for the information recorded on the recording medium, i.e., CD-ROM 40a provided at the terminal 6, or updating information which requires updating of the information recorded on the CD-ROM 40a to transmit the information thus requested from the center 3 to the terminal 6.

Initially, at step S300, the CPU 46 of the terminal 6 sets up information (medium ID) indicating (specifying) the relationship between recording medium, i.e., CD-ROM 40a and information subject to updating and user ID at user/user information as updating instruction.

At step S301, the encipherment/decipherment circuit 41 enciphers user/user information (UUI). The converting circuit 50 converts the enciphered user/user information into information of the data format corresponding to the communication line 4. The communication interface 51 modulates the format converted user/user information in accordance with a predetermined modulation system to originate call to the center 3 as call setting message.

At step S200, when the communication interface 29 of the center 3 receives call setting message from the terminal 6 (call incoming), it demodulates the message. The converting circuit 28 implements reverse conversion corresponding to the format conversion at the converting circuit 50 of the terminal 6. The encipherment/decipherment circuit 23 deciphers (decodes) the enciphered call setting message.

At step S201, the CPU 24 extracts user ID included in the user/user information within the call setting message.

At step S202, the CPU 24 inspects (checks) from information stored at the information storage unit 22 on the basis of the user ID whether or not corresponding user can accept service.

At step 203, the CPU 24 extracts medium updating request command from the user/user information to thereby recognize that the current command is updating request of medium information.

At step S204, the CPU 24 discriminates, from medium ID included in the user/user information, a recording medium that the user of the terminal uses at present.

At step S205, the CPU 24 discriminates, from the user/user information, information that the user is making a request for updating at present.

At step S206, the CPU 24 retrieves management information (directory) relating to the corresponding recording medium from the information storage unit 21 on the basis of the user ID obtained at the step S201.

At step S207, the CPU 24 determines information necessary for updating from the information storage unit 21 on the basis of the information obtained at the step S206.

At step S208, the CPU 24 reads out the information determined as above from the information storage unit 21. The encipherment/decipherment circuit 23 carries out encipherment of the information thus read out. The converting circuit 28 converts the enciphered information into information of the data format corresponding to the communication line 4. The communication interface 29 modulates the format converted information in accordance with a predetermined modulation system to send out it to the terminal 6 of user through the communication line 4.

At this time, at step S302, the communication interface 51 of the terminal 6 receives and demodulates updating information transmitted through the communication line 4. The converting circuit 50 implements reverse conversion corresponding to the conversion at the converting circuit 28 of the center 3 to the format converted updating information. The encipherment/decipherment circuit 41 deciphers (decodes) the enciphered updating information. The CPU 46 stores the updating information into the information storage unit 42 in a manner caused to be in correspondence with the information ID.

When sending out (transmission) of the updating information is completed, the CPU 24 of the center 3 updates, at step S209, charging information of user stored at the information storage unit 22 to carry out charging processing.

At step S210, the CPU 24 issues (makes), to the terminal 6, a request for updating of medium management information recorded in the information storage unit 42.

Responding to this updating request, the CPU 46 of the terminal 6 carries out updating of medium management information recorded in the information storage unit 42 at step S302.

It is to be noted while explanation has been given in the above-described more practical operation in connection with the case where request for updating of the medium management information is issued (made) from the center 3, an approach may be employed such that after storage of updating information (step S302) is carried out at the terminal 6, updating of the medium management information is automatically carried out at the terminal 6 without allowing the center 3 to issue updating request therefrom.

Figure 8:
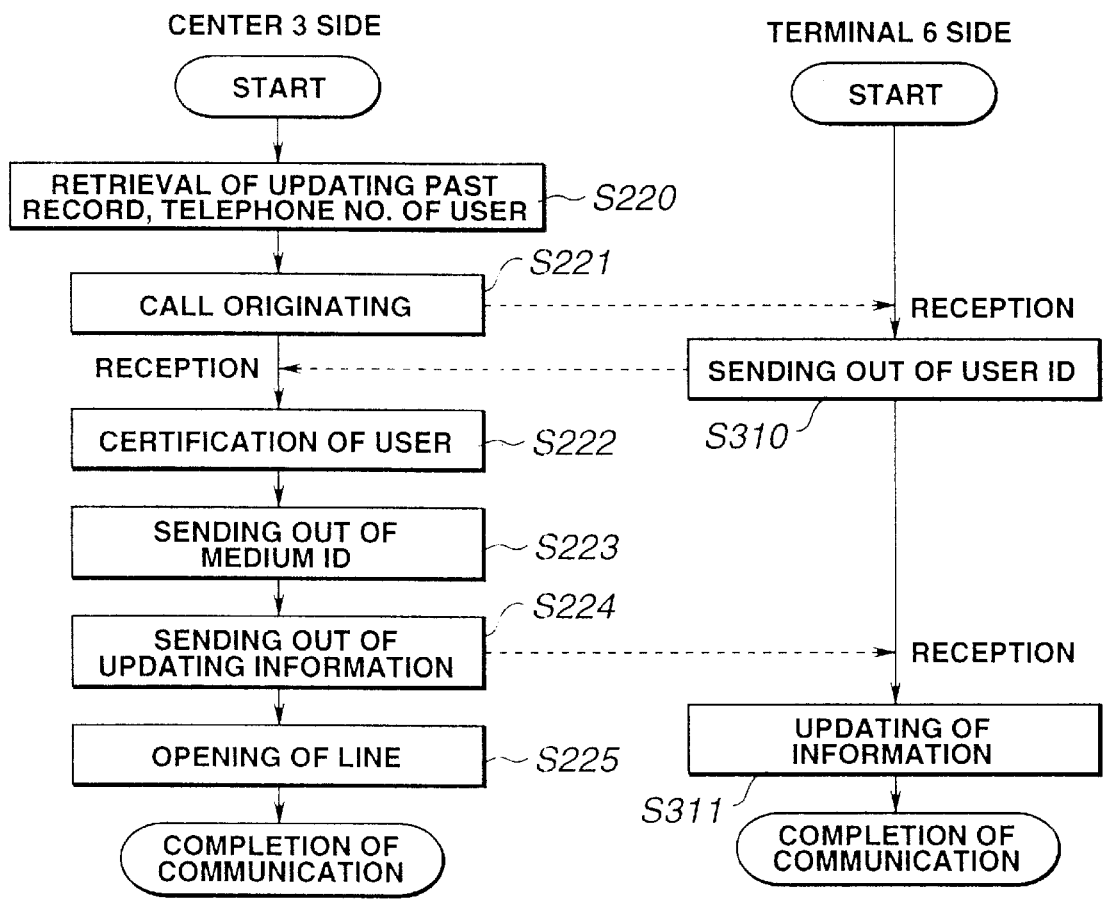
FIG. 8 is a flowchart showing other operations at the center and the terminal shown in FIGS. 5 and 6.

A more practical operation of the center 3 and the terminal 6 in the case where there is a necessity of updating of information of the recording medium of the terminal 6 such that updating of the number of certain stocked articles (goods) in shopping catalog is carried out, i.e., when a request for updating of information is issued from the center 3 will now be described with reference to the flowchart shown in FIG. 8. Explanation will be given in connection with the case where, e.g., analog telephone line is used as the communication line 4.

At step S220, the CPU 24 of the center 3 retrieves updating past record information of user and telephone number information of user stored at the information storage unit 22.

At step S221, the CPU 24 connects user and line (carries out call originating) through the communication interface 29.

At step S310, the CPU 46 of the terminal 6 sends out user ID to the center 3 through the communication interface 51.

At step S222, the CPU 24 of the center 3 carries out, on the basis of user ID obtained through the communication interface 29, the certification that corresponding user is normal user.

At step S223, the CPU 24 sends out medium ID for identifying medium on which information necessary for updating is recorded to the terminal 6 through the communication interface 29. Namely, the information provider carries out management of ID of recording media of all users, and is adapted to send, to user, ID of the recording medium including information that he desires to update. Then, the CPU 46 of the terminal 6 receives medium ID from the communication interface 51 to read out corresponding medium management information from the information storage unit 42 to make preparation for updating (set-up of updating).

At step S224, the CPU 24 of the center 3 enciphers updating information by the encipherment/decipherment circuit 23 to send out it to the communication line 4 though the communication interface 29.

At step S311, the CPU 46 of the terminal 6 transfers information to be updated from management information of the corresponding medium stored in the information storage unit 42 to the RAM 43. The CPU 46 makes a change of corresponding information which has been transferred to the RAM 43 on the basis of the received updating information thereafter to store the updated information into the storage unit 42.

At step S225, the CPU 24 of the center 3 carries out opening of the line.

Thus, the information provider can carry out updating of information of desired recording medium through the communication line 4. On the other hand, the user can utilize the latest information.

It is to be noted while explanation has been given in connection with the case where ISDN line or analog telephone line is used as the communication line, even if other communication networks, e.g., satellite network or LAN, etc. are utilized, similar operations can be made.

Figure 9:
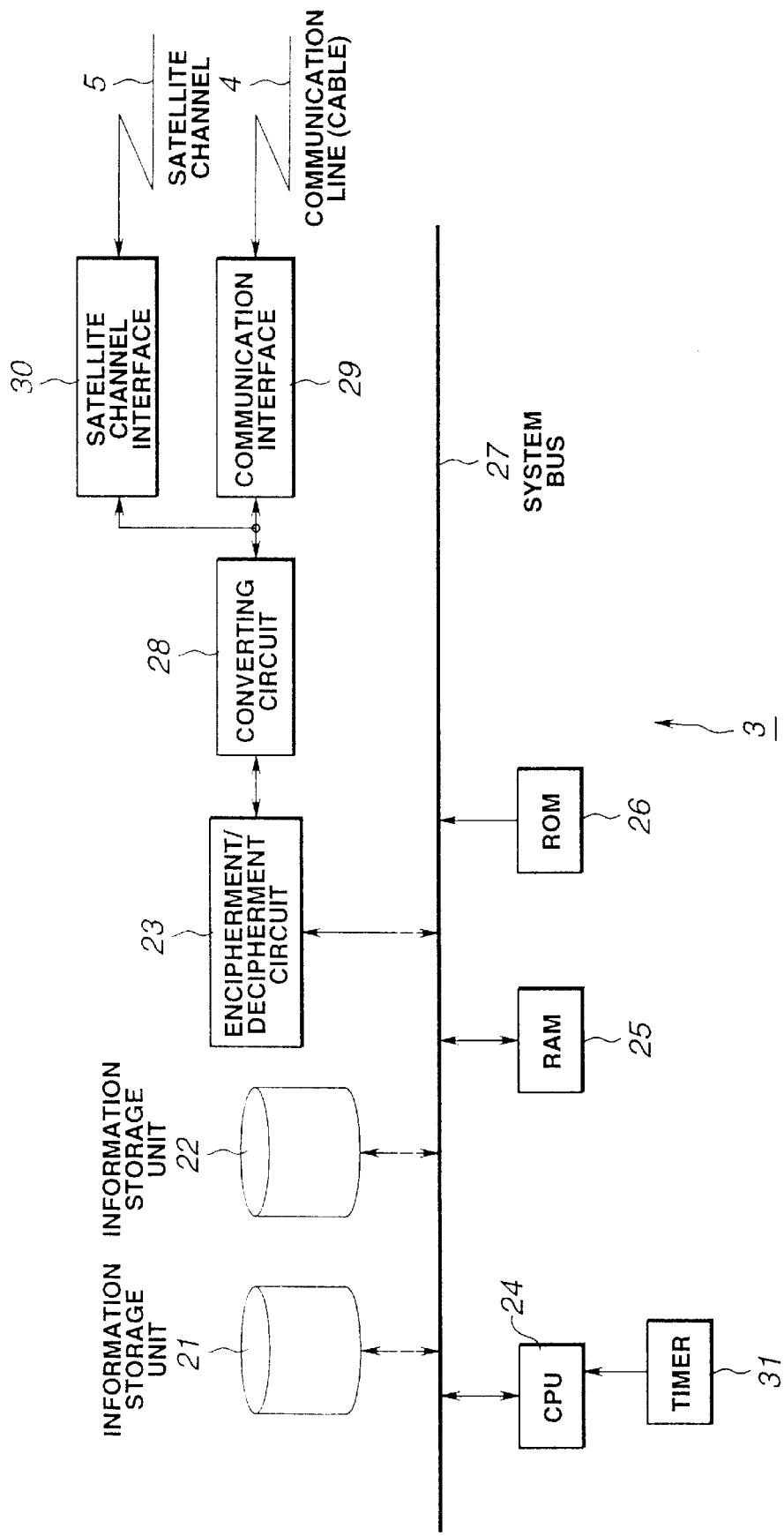
FIG. 9 is a block diagram showing the configuration of another embodiment of the center according to the information providing system of this invention.
Figure 10:
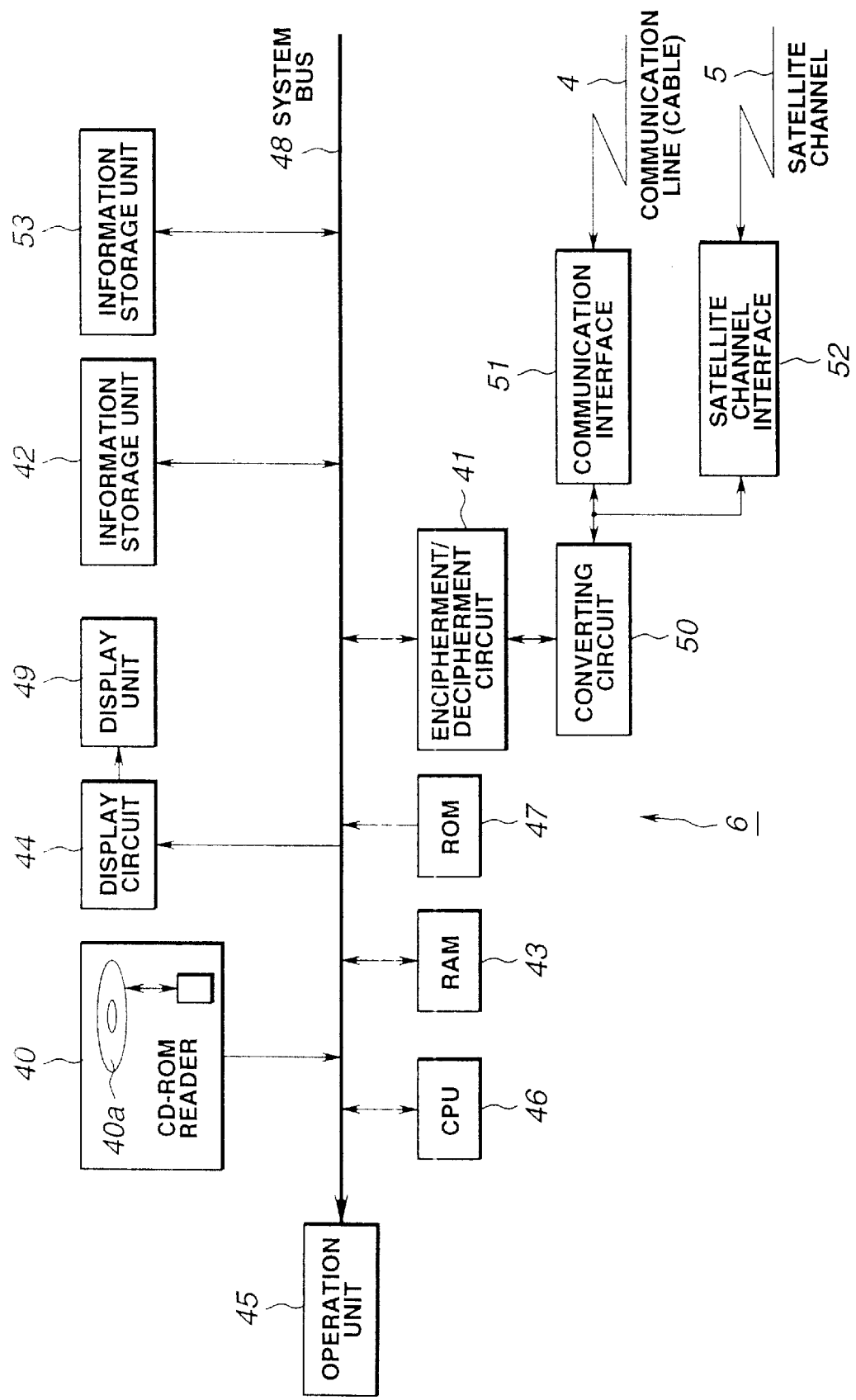
FIG. 10 is a block diagram showing the configuration of another embodiment of the terminal according to the information providing system of this invention.

Explanation will now be given in connection with a second embodiment of this invention in which the above-described communication line 4 is utilized and the above-described satellite channel 5 shown in FIG. 2 is utilized as transmission means for information. FIGS. 9 and 10 are block diagrams showing more practical configuration of the center 3 and the terminal 6 in the case where two networks (communication paths) of the communication line 4 and the satellite channel are utilized. In this case, the same reference numerals are respectively attached to the same circuits as the circuits constituting the center 3 shown in FIG. 5, and the same reference numerals are respectively attached to the circuits constituting the terminal 6 shown in FIG. 6. Explanations thereof will be omitted.

Namely, the center 3 having the configuration shown in FIG. 9 further includes a satellite channel interface 30 for sending out format converted information from the converting circuit 28 to the satellite channel 5. Thus, the center 3 can carry out transmission of information by using the satellite channel 5 together with communication line 4.

On the other hand, the terminal 6 having the configuration shown in FIG. 10 further includes a satellite channel interface 52 for receiving information transmitted through the satellite channel 5 from the center 3 to deliver the received information to the converting circuit 50, and comprises an information storage unit 53 connected to the system bus 48.

Further, the satellite channel interface 30 of the center 3 modulates the format converted information from the converting circuit 28 in accordance with a modulation system in conformity with the satellite channel 5 to transmit a modulated signal to a satellite through so called up link RF1. The satellite amplifies the modulated signal to transmit it to the terminal 6 through so called down link RF2. The satellite channel interface 52 of the terminal 6 receives and demodulates the modulated signal to deliver the format converted information thus obtained to the converting circuit 50. In addition, the information storage unit 53 functions as backup of the information storage unit 42.

Explanation will now be given in connection with more practical operation of the center 3 and the terminal 6 in the case where, e.g., musical instrument information is transmitted from the center 3 to the terminal 6.

The musical instrument information is data of relatively large capacity consisting of images and music as well known. Accordingly, an approach is employed to transmit, at the same time, information that requests from a large number of terminals 6 are expected, e.g., new music information, etc. by using transmission means of the broadcasting type, i.e., satellite channel (network) 5, thereby making it possible to efficiently transmit the same information to plural terminals 6. On the other hand, an approach is employed to transmit, through the transmission line 4, information or updating information that individual terminals 6 request, thereby making it possible to cope with special requests of respective terminals 6. Thus, efficient information transmission can be realized as a whole.

In more practical sense, the information storage unit 22 is comprised of, e.g., magnetic tape, magnetic disc, optical disc, magneto-optical disc, etc. On this information storage unit 22, as shown in FIG. 11, user management information consisting of terminal ID for identifying user of terminal who has made contract with a musical instrument information provider, registered telephone number, charging information and updating date is assumed to be stored. Moreover, the information storage information unit 21 is similarly comprised of, e.g., magnetic tape, magnetic disc, optical disc or magneto-optical disc, etc. On this information storage unit 21, as shown in FIG. 12, management information for musical instrument information consisting of information ID, music information, charging information, registrated date and storage position information every stored music, i.e., respective musical instrument information is assumed to be stored. In this case, names of music, playing times, names of songwriter and musical composers, etc. are included in the music information. Moreover, the registrated date indicates date that music information is registered on the information storage unit 21. The storage position information is address indicating storage position of actual musical instrument information.

Figure 13:
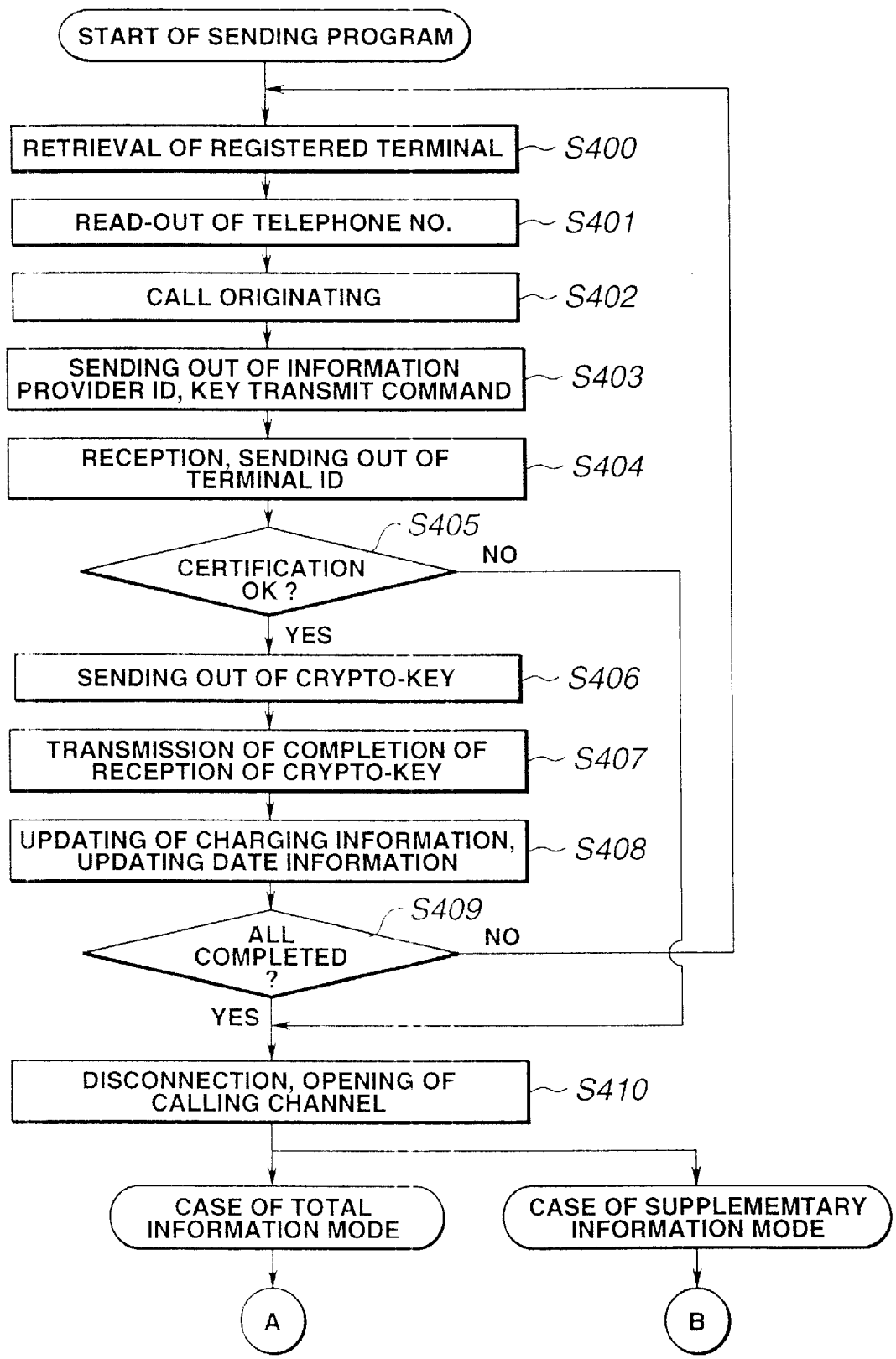
FIG. 13 is a flowchart showing the operation at the center and the terminal shown in FIGS. 9 and 10.
Figure 14:
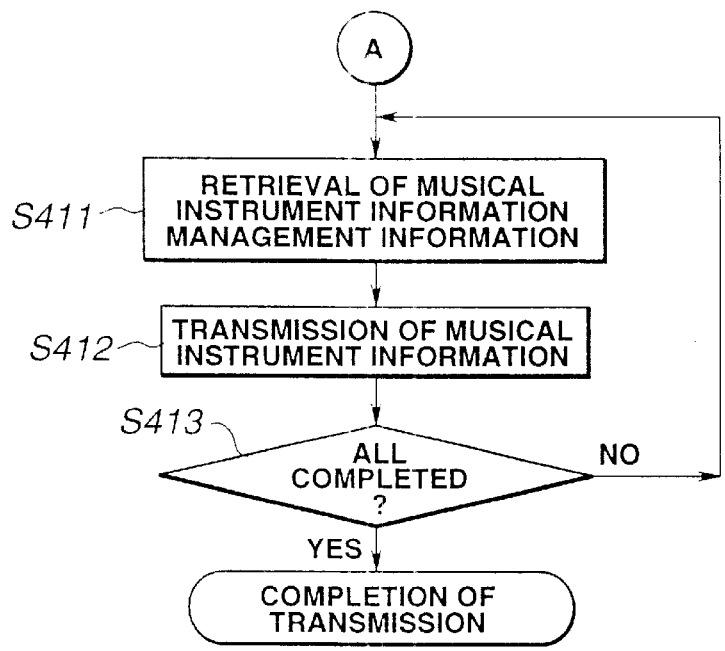
FIG. 14 is a flowchart showing the operation in the first mode of the center and the terminal shown in FIGS. 9 and 10.
Figure 15:
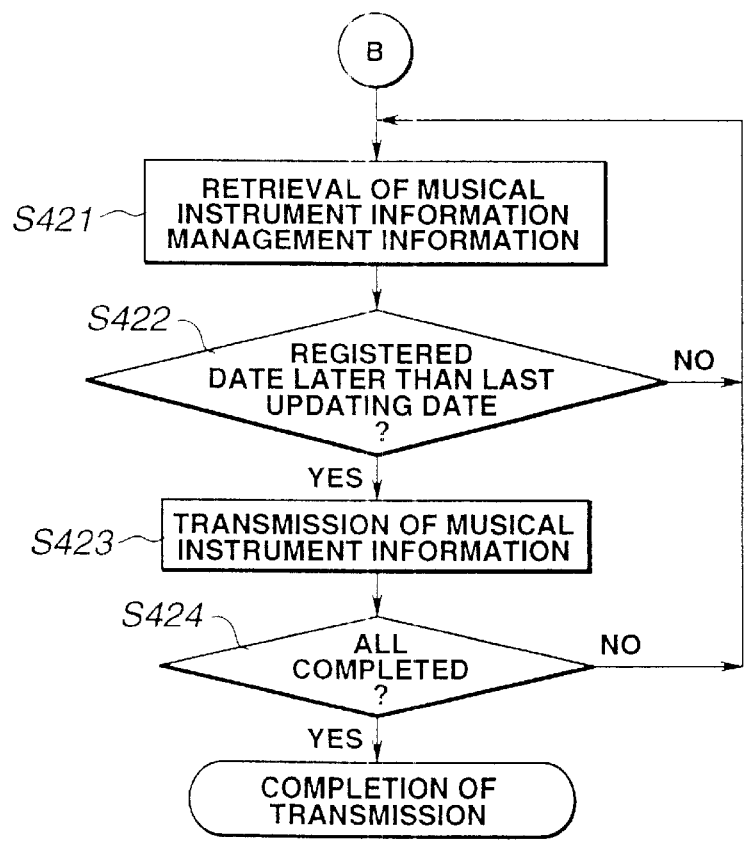
FIG. 15 is a flowchart showing the operation in the second mode of the center and the terminal shown in FIGS. 9 and 10.

In the case of occasionally (whenever occasion) or periodically sending out musical instrument information from the center 3 to the terminal 6 through the satellite channel 5, the center 3 and the terminal 6 operate in accordance with, e.g., the flowchart shown in FIGS. 13 to 15.

Initially, the CPU 24 of the center 3 starts sending program periodically or artificially occasionally (whenever occasion) by clocking (timer) information from timer 31.

At step S400, the CPU 24 of the center 3 retrieves user management information of the registered terminal (hereinafter also referred to as terminal management information) preserved (stored) on the information storage unit 22 to copy it into the RAM 25.

At step S401, the CPU 24 reads out telephone numbers of the registered terminals of all users which carry out transmission from the terminal management information copied into the RAM 25.

At step S402, the CPU 24 allows the telephone number thus read out to undergo call originating through the communication interface 29.

At step S403, the CPU 24 superimpose key transmit command to hasten to make preparation for reception of ID of the information provider and cryptoanalytic key information key for deciphering cryptograph of musical instrument information on user/user information to send out it to the terminal 6 through the communication interface 29, and to transmit cryptoanalytic key information for deciphering cryptograph of musical instrument information to be transmitted.

At step S404, the CPU 46 of the terminal 6 detects from the user/user information received through the communication interface 51 that current sending out operation is sending out of cryptoanalytic key. Moreover, when the CPU46 has made arrangement of reception (i.e., has completed preparation therefor), it transmits terminal ID (user ID) to the center 3 through the communication interface 51 in the state superimposed on the user/user information.

At step S405, the CPU 24 of the center 3 extracts the terminal ID (user ID) from the user/user information received through the communication interface 29 to carry out certification by comparing the terminal ID (user ID) and the terminal ID copied into the RAM 25 at the step S401. In the case where certification is bad (No), the CPU 24 carries out disconnection/opening processing of calling line or channel at step S410. On the other hand, in the case where certification is OK (YES), the CPU 24 superimposes the cryptoanalytic key on the user/user information at step S406 to send out it to the terminal 6 through the communication interface 29.

When the CPU 46 of the terminal 6 correctly receives the cryptoanalytical key at step S407, it superimpose information indicating completion of reception of cryptoanalytical key on the user/user information to transmit it to the center 3 through the communication interface 51.

At step S408, the CPU 24 of the center 3 updates charging information and updating date information of the terminal management information copied into the RAM 25.

At step S409, the CPU 24 judges whether or not the processing operations of the step S400 to the step S408 are completed with respect to the terminals registered in the terminal management information. If so, disconnection/opening processing of calling channel is carried out at the step S410. Namely, until the processing operation have been completed with respect to all of terminals, the processing operations of the step S400 to the step S408 are repeatedly carried out. After the disconnecting/opening processing of the calling channel is carried out at the step S410, actual musical instrument information is transmitted to the terminal 6 through the satellite channel 5.

In more practical sense, for transmission of musical instrument information, there are two operation modes of the mode for sending out all information and the mode for transmitting only information supplemented to the information sent out last time. Which any one of these two operation modes is selected is determined from, e.g., convenience in data management of the information provider. The center 3 and the terminal 6 operate in accordance with the flowchart shown in FIG. 14, for example, when the operation mode is the mode for sending all information, and operates in accordance with the flowchart shown in FIG. 15, for example, when the operation mode is the mode for sending supplementary information (or updating information).

Namely, in the case of the mode for sending all information, at step S411 shown in FIG. 14, the CPU 24 of the center 3 reads out management information (directory information) of musical instrument information stored on the information storage unit 21 to retrieve storage position information included in the management information to read out actual musical instrument information from the information storage unit 21.

At step S412, the CPU 24 enciphers the information thus read out by the encipherment/decipherment circuit 23 to carry out format conversion by the converting circuit 28 to transmit it to the terminal 6 through the satellite channel interface 30.

At step S413, the CPU 24 repeats the above-mentioned operation until transmission of all of information of musical instrument information stored in the management information is completed.

On the other hand, in the case of the mode for sending supplementary information (or updating information), at step S421 shown in FIG. 15, the CPU 24 of the center 3 retrieves management information (directory information) of musical instrument information stored on the information storage unit 21.

At step S422, the CPU 24 carries out comparative processing as to whether the registered date information included in the management information is later than the last updating date (transmission date). In the case where the former is later than the latter, i.e., in the case where there is any supplementary information, the CPU 24 reads out actual musical instrument information from the information storage unit 21 at step S423. On the other hand, in the case where the former is older than the latter, the processing operation by the CPU 24 returns to the step S421.

At step S423, the CPU 24 enciphers the information thus read out by the encipherment/decipherment circuit 23 to carry out format conversion by the converting circuit 28 to transmit it to the terminal 6 through the satellite channel interface 30 and the satellite channel 5.

At step S424, the CPU 24 repeats the above-mentioned operation until transmission operations of all musical instrument information stored in the management information are completed.

It is to be noted that the terminal 6 adapted for receiving transmitted musical instrument information to store it includes information storage units of two systems of the information storage unit 42 and the information storage unit 53 to doubly store transmitted musical instrument information, thereby making it possible to avoid accident such as losing (disappearance) of information, etc. In addition, it is needless to say that even if there is employed an approach to send musical instrument information by using the satellite channel 5 by means of the CD-ROM reader 40, the necessary minimum number of music can be ensured at the terminal 6.

Moreover, while explanation has been given in the above-described embodiment in connection with the case where the ISDN line or the analog telephone line is used as the communication line 4, transmission network such as CATV network, Local Area Network (LAN), etc. may be used.

As seen from the foregoing description, the information providing system of the above-described embodiment includes, at the terminal, the reader for the recording medium such as CD-ROM, etc. on which information are recorded in advance to have an ability to issue, to the center, a request for new information except for the information recorded on the CD-ROM or information for which updating is required of the information recorded on the CD-ROM. Accordingly, even if information is updated, user can efficiently obtain latest information without exchanging the CD-ROM.

Moreover, this information providing system includes, at the terminal, the reader for the recording medium such as CD-ROM, etc. on which information are recorded in advance, and the information storage unit for storing information sequentially transmitted from the center to have an ability to issue, to the center, a request for new information or updating information except for information stored on the CD-ROM and information stored in the information storage unit. Accordingly, it is possible to reduce the running cost such as channel (line) connection fee, etc., and to efficiently transmit desired information to the terminal.

Further, this information providing system utilizes, e.g., the communication line in which cable is used as the transmission medium, and the satellite (network) channel as means for reception/transmission of information between the center and the terminal to collectively transmit, e.g., common updating information with respect to respective terminals in a broadcasting form by using satellite channel, and to transmit necessary individual information through the communication lines every respective terminals, thereby making it possible to economically carry out transmission of information with respect to the terminal from the center.

Further, in this information providing system, the center has management information indicating medium ID indicating kind of recording media of the terminals, information ID every information recorded on those recording media, and updating times every terminals. Accordingly, it is possible to securely transmit updating information with respect to respective terminals. Thus, service with respect to respective terminals can be improved.

Further, in this information providing system, the center receives request information from the terminal to judge whether or not that terminal can utilize service of information, thereby making it possible to ensure security in transmission of information.

Further, in this information providing system, when the center receives request information from the terminal to transmit new information or updating information with respect to the recording media that the terminal has, an approach is employed to carry out charging processing with respect to the terminal which has issued request information, thereby making it possible to guarantee sound use of the information provider side.

Further, in this information providing system, musical instrument information is recorded on, e.g., CD-ROM that the terminal has. Thus, musical instrument information of new music is transmitted from the center in a broadcasting form through the satellite channel, thereby making it possible to reduce the information transmission cost and the required time thereof.

Further, in this information providing system, since musical instrument information is periodically transmitted in a broadcasting form from the center to the terminal, subscriber side can acquire, e.g., musical instrument information of new music without delay.

A third embodiment of the information providing system according to this invention will now be described.

The third embodiment of the information providing system according to this invention will now be described.

The information providing system of the third embodiment includes, as shown in the FIG. 2 mentioned above, for example, information providing equipments 1A to 1D, center 3 and terminal 6. It is to be noted that since the information providing equipments 1A to 1D have the same configuration as that of the above-described first embodiment, their explanation is omitted here.

The center 3 comprises, as shown in the FIG. 5 mentioned above, for example, information storage units 21, 22, encipherment/decipherment circuit 23, CPU 24, RAM 25, ROM 26, system bus 27, converting circuit 28, and communication interface 29.

Further, on the information storage unit 21 of the center 3 comprised of magnetic tape, magnetic disc, optical disc or magneto-optical disc, etc. as described above, information received from the information providing unit 1 (1A to 1D) and offered (provided) to user (e.g., on line shopping catalog information, music information, game software or the like) are stored. Similarly, on the information storage unit 22 comprised of magnetic tape, magnetic disc, optical disc or magneto-optical disc, etc. as described above, user management information and information management information necessary for totalizing access frequency of information, etc. are stored. In this case, the user management information is information necessary for customer management such as address, distinction of sex, age and occupation of user, user ID, and charging information every user, etc.

The ROM 26 stores therein control program that the CPU 24 executes and management information for carrying out management of the information storage unit 21. Moreover, the RAM 25 suitably stores temporary charging states or access states of respective users, etc. when the CPU 24 performs various operations.

The CPU 24 controls the entirety of the center 3 through the system bus 27, and performs various operations.

The communication interface 29 receives information from the information providing unit 1 through the communication line 2, or information from the terminal 6 through the communication line 4 to deliver it to the converting circuit 28, and to output information to be sent out from the center 3 to the communication line 2 or the communication line 4.

The converting circuit 28 converts information sent out from the center 3 into information of the data format corresponding to the communication line 2 or the communication line 4 to deliver it to the communication interface 29, and to carry out conversion processing opposite to the above. The encipherment/decipherment circuit 23 enciphers information sent out from the center 3, and carries out decipherment of the enciphered information in a manner opposite to the above.

The terminal 6 comprises, as shown in the FIG. 6, mentioned above, for example, CD-ROM reader 40, encipherment/decipherment circuit 41, information storage unit 42, RAM 43, display circuit 44, operation unit 45, CPU 46, ROM 47, system bus 48, display unit 49, converting circuit 50, and communication interface 51.

Further, the communication interface 51 receives information which has been sent from the center 3 through the communication line 4 to deliver it to the converting circuit 50, and to output, to the communication line 4, information from the terminal 6.

The converting circuit 50 converts information transmitted from the terminal 6 into information of the data format corresponding to the communication line 4, and implements conversion opposite to the above to the information from the communication interface 51 to deliver it to the encipherment/decipherment circuit 41. The encipherment/ decipherment circuit 41 deciphers (decodes) the enciphered information to output it to the system bus 48, and to encipher information sent out from the terminal 6 to output it to the converting circuit.

The ROM 47 stores therein control program for controlling the entirety of the terminal 6 and management information of the terminal 6 (information indicating what feature (characteristic in hardware) the terminal has). The ROM 43 stores temporary information such as charging information of user, use information, of CD-ROM 40a that the CD-ROM reader 40 has read, or the like. The information storage unit 42 is comprised of, e.g., magnetic tape, magnetic disc, optical disc or magneto-optical disc, etc., and stores information sent out from the center 3.

The CD-ROM reader 40 reads information recorded on the CD-ROM 40a that user has purchased to output it to the system bus 48.

The CPU 46 executes control program stored in the ROM 47 to control the entirety of the terminal 6. The operation unit 45 delivers command corresponding to operation by user to the CPU 46. Moreover, the display circuit 44 converts information delivered through the system bus 48 into such a signal that the display unit 49 can display to deliver that signal to the display unit 49. The display unit 49 displays picture image based on the signal delivered from the display circuit 44.

Figure 16:
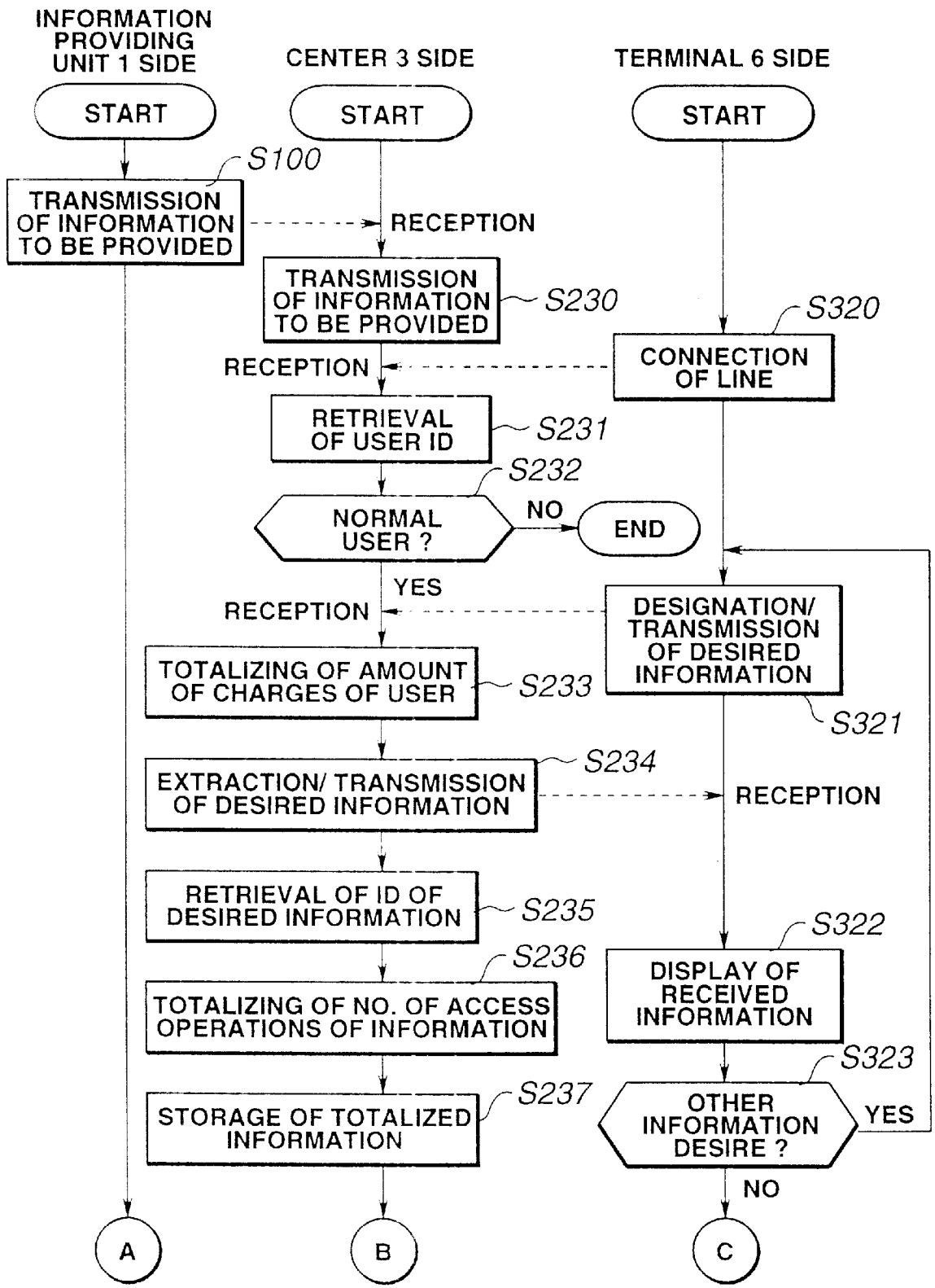
FIG. 16 is a flowchart for explaining the operation of the center of this invention.

Explanation will now be given with reference to the flowchart shown in FIGS. 16 and 17 in connection with more practical operation of the information providing unit 1, the center 3 and the terminal 6. In these figures, solid lines represent flow of operations of respective units with passage of time, and dotted lines represents transmission path of information between respective units.

At step S100, the CPU 15 of the information providing unit 1 reads out information to be provided stored on the information storage unit 11. The encipherment/ decipherment circuit 12 enciphers that information. The converting circuit 13 converts the enciphered information into information of the data format which can be sent out to the communication line 2. The communication interface 14 transmits the format converted information to the center 3 through the communication line 2.

When this information is received at the communication interface 29 of the center 3, the converting circuit 28 implements, at step S230, conversion opposite to that of the first converting circuit 13 of the information providing unit 1. The encipherment/decipherment circuit 23 deciphers (decodes) the enciphered information. Then, this information is stored onto the information storage unit 21.

When user carries out operation of connection to the center 3 at the operation unit 45 of the terminal 6 at step S320, the CPU 24 of the center 3 recognizes connection of the line to the terminal 6. At step S231, user ID is read from user management information stored on the information storage unit 22. Further, at step S232, whether or not the user which has carried out connection of the line is normal user of this information service system is judged by comparison between the user ID which has been read at the step S231 and the user ID sent from the user. When it is judged that user is not normal user, the CPU 24 cuts off connection of the line so that no offer of service is carried out.

On the other hand, when it is judged that user is normal user, the CPU 46 of the terminal 6 transmits, to the center 3, designation signal of desired information (e.g., signal corresponding to menu No. selected by user)in accordance with operation at the operation unit 45 of user. When the center 3 receives the designation signal of the desired information, the CPU 24 of the center 3 carries out totalization of amounts of charges of user at step S233.

At step S234, the CPU 24 extracts information that user desires of the information received from the information providing unit stored on the information storage unit 21 to transmit it to the terminal 6 through the communication line 4. When the CPU 46 of the terminal 6 receives this information, the CPU 46 displays picture image based on the received information on the display unit 49 through the display circuit 44 at step S322.

Moreover, at the center 3, at the step S235 after the operation of the step S234 is completed, the CPU 24 retrieves information ID of the desired information from the information ID every information which is stored on the information storage unit 22.

At step S236, the CPU 24 accumulatively adds the number of access operations to the information ID of the desired information to thereby carry out totalization of the number of access operations of the information. In more practical sense, the CPU 24 prepares, as shown in FIG. 18, for example, totalizes the total number of access operations with respect to the information ID, etc. to prepare totalized information.

At step S237, the CPU 24 stores, onto the information storage unit 22, totalized result of amount of charges of user totalized at the step S233 and the totalized result of the number of access operations of information totalized at the step S236.

On the other hand, at step S323 after display of received information is carried out at the step S322, the CPU 46 carries out judgment as to whether or not user desires any other information. When it is judged that user desires other information, processing by the CPU 46 returns to the step S321. As a result, designation of any other desired information is carried out.

Figure 17:
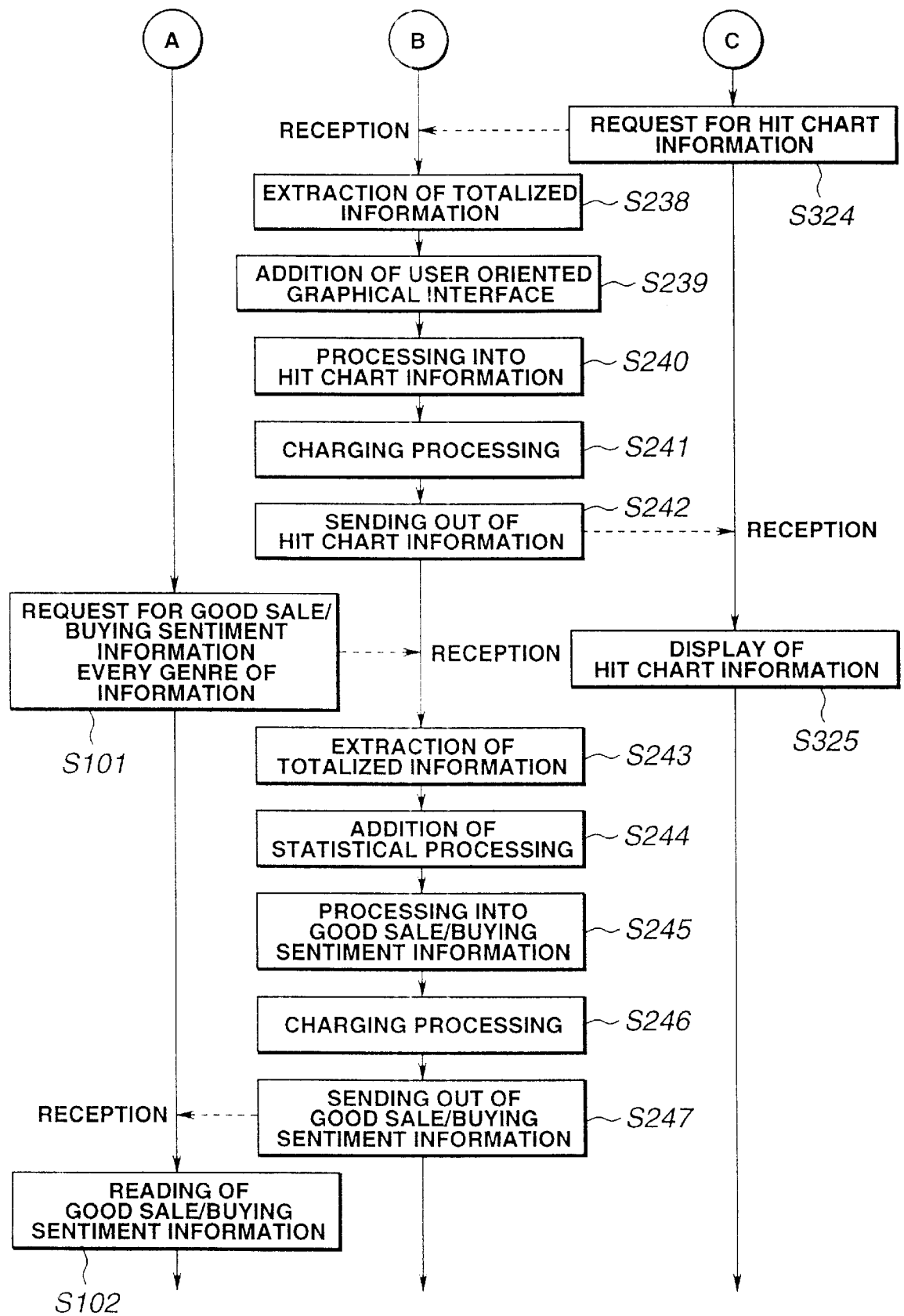
FIG. 17 is a flowchart for explaining the operation of the center of this invention.

When the CPU 46 judges that user does not desire other information, it sends out command of request for hit chart information to the center 3 at step S324 shown in FIG. 17.

When the CPU 24 of the center 3 receives the command of request for hit chart information, it extracts totalized information stored on the information storage unit 22 at step S238.

At step S239, the CPU 24 adds user oriented graphical interface to the totalized information extracted at the step S238 so that graphic display can be made in displaying such information.

At step S240, the CPU 24 processes the totalized information into hit chart information.

At step S241, charging processing (charging with respect to hit chart request) of user is carried out. Such charging information is stored (accumulated) onto the information storage unit 22.

At step S242, the CPU 24 sends out the hit chart information processed at the step S240 to the terminal 6 through the communication line 4 from the communication interface 29.

When the CPU 46 of the terminal 6 receives the hit chart information, it displays the hit chart information on the display unit 49 at step S325. As a result, user can recognize fashion of the present day by looking at the hit chart information.

On the other hand, the CPU 15 of the information providing unit 1 sends out command of request for good sale/buying sentiment information every genre of information to the center 3 at step S101.

When the CPU 24 of the center 3 receives the command of request for good sale/buying sentiment information every genre of information, it extracts the totalized information stored (accumulated) on the information storage unit 22.

At step S244, the CPU 24 implements statistical processing to the totalized information to add, e.g., data every sex or every age, etc. thereto.

At step S245, the CPU 24 processes the totalized information into good sale/buying sentiment information (which will be described later).

At step S246, the CPU 24 carries out charging processing (charging with respect to good sale/buying sentiment information request) with respect to the information provider to store (accumulate) this charging information onto the information storage unit 22.

At step S248, the CPU 24 sends out the good sale/buying sentiment information from the communication interface 29 to the information providing unit 1 through the communication line 2. When the information providing unit 1 receives the good sale/buying sentiment information, the CPU 15 of the information providing unit 1 reads such information at step S102.

It is to be noted that the operation of the step S238 to the step S247 may be carried out at a fixed period.

Such good sale/buying sentiment information are collectively allocated every items such as age, sex, occupation and address, etc. of users which have utilized these information.

The information provider can carry out marketing research by recognizing the good sale/buying sentiment information.

Thus, the user and the information provider can recognize desired totalized information.

The system of the third embodiment eventually becomes the above-described system shown in FIG. 3. Namely, the information providing unit 1 offers provided information to the center 3. The terminal 6 makes a request for supply of information to the center 3. Responding to this, the center 3 carries out supply of information to the terminal 6.

Moreover, the information providing unit 1 makes a request for good sale/buying sentiment information (marketing information) to the center 3. Responding to this, the center 3 carries out supply of the good sale/buying sentiment information.

Similarly, the terminal 6 makes a request for hit chart information to the center 3. Responding to this, the center 3 delivers hit chart information.

It is to be noted while ISDN line is used as the communication line, analog telephone network, LAN, B-ISDN (Broadband ISDN), etc. may be employed in addition to the above.

Moreover, there may be employed a configuration in which telephone line is used as the communication line from the terminal 6 to the center 3, and communication satellite network is used as the communication line in an opposite direction in the case where quantity of information to be transmitted is large, and telephone line is used for this purpose in the case where quantity of information to be transmitted is not large. In this case, communication speeds (rates) (at communication paths in directions opposite to each other) between the terminal and the center 3 become asymmetrical.

Moreover, while the information providing unit 1 (1A to 1D) transmits information to the center 3 through the communication line 2, and the center 3 transmits these information to the terminal 6, offer of information may be carried out by using the CD-ROM in addition to the above.

In more practical sense, e.g., the service provider of the center 3 records information that the information providing unit 1 (1A to 1D) has transmitted onto the CD-ROM to sell such CD-ROMs to users at low cost or distribute them free of charge. In the case where user accepts an offer of information, he purchases the CD-ROM to load it into the CD-ROM reader 40. The CD-ROM reader 40 reads a list of information recorded on the CD-ROM. The CPU 46 displays the list of information on the display unit 49.

Looking at the list of information displayed on the display unit 49, user operates the operation unit 45 to thereby select desired information. The CD-ROM reader 40 reads the selected information from the CD-ROM. The CPU 46 displays this information on the display unit 49. Moreover, at this time, the CPU 46 stores use state (situations) of the CD-ROM into the RAM 43.

When utilization of information is completed, the CPU 46 carries out connection of line to the center 3 to transmit the use state (situations) of the CD-ROM stored in the RAM 43 to the center 3 through the communication line 4. The center 3 totalizes amount of charges and the number of utilization operations of information of user from the received use situation information of the CD-ROM to store (accumulate) it onto the information storage unit 21.

When the center 3 accepts offer of hit chart information from the terminal 6, it processes the totalized information into hit chart information to send out it to the terminal 6. On the other hand, when the center 3 receives request for good sale/buying sentiment information from the information providing unit 1, it processes totalized information into good sale/buying sentiment information to send out it to the information providing unit 1.

Thus, user of the terminal 6 can retrieve information subject to buying sentiment at present, or recognize hit chart, etc. of music or game software, etc. Moreover, the information providing unit 1 can grasp utilization situations of respective information utilized every age, sex, occupation.

A fourth embodiment of an information providing system according to this invention will now be described.

The information providing system of the fourth embodiment includes center 3 and terminal 6 as shown in the FIG. 2 mentioned above, for example.

The center 3 comprises, as shown in the FIG. 9 mentioned above, for example, information storage units 21, 22, encipherment/decipherment circuit 23, CPU 24, RAM 25, ROM 26, system bus 27, converting circuit 28, communication interface 29, and satellite channel interface 30.

The terminal 6 comprises, as shown in the FIG. 10 mentioned above, for example, CD-ROM reader 40, encipherment/decipherment circuit 41, information storage unit 42, RAM 43, display circuit 44, operation unit 45, CPU 46, ROM 47, system bus 48, display unit 49, converting circuit 50, communication interface 51, and satellite channel interface 52. Moreover, the center 3 and the terminal 6 are connected by way of communication line such as telephone line or ISDN line or B-ISDN line, etc. so that information can be subjected to transmission in a bi-directional fashion. Further, connection is made by broadcasting network through satellite (network) channel 5 from the center to the terminal 6 so that information can be subjected to transmission. In this case, communication speeds (rates) of the communication line 4 and the broadcasting network through the satellite channel 5 are asymmetric.

The information storage unit 21 of the center 3 stores multimedia shopping information or game software information. The information storage unit 22 stores access management information (information caused to be related to characteristic (sex, age, etc.) of users who have accessed) including charging information every users, management information of users, and access past record information (information of a structure in which the number of access operations and/or access date, etc. are caused to correspond to information ID) indicating access situations. This access management information is sent from the user side as described later.

The encipherment/decipherment circuit 23 carries out encipherment processing with respect to information sent out from the center 3. The converting circuit 28 carries out data format conversion of enciphered information. The communication interface 29 and the satellite channel interface 30 are respectively interfaces for connection to the communication line 4 and the satellite channel 5.

The ROM 26 stores control program and/or management information indicating hardware specification, e.g., size of capacity etc. The CPU 24 executes the control program (temporarily stores operation result in a certain operation processing process). The RAM 25 stores information indicating the present circumstances. The system bus 27 consists of data bus, address bus and control bus which connect (interconnect) respective circuits.

On the other hand, the CD-ROM reader 40 of the terminal 6 reads information recorded on the CD-ROM 40a. The information storage unit 42 stores information received from the satellite channel 5 or the communication line 4. The communication interface 51 and the satellite channel interface 52 are respectively interfaces for connection to the communication line 4 and the satellite channel 5. The encipherment/decipherment circuit 41 deciphers (decodes) encipherment processed information (enciphered information) sent from the center 3.

The RAM 43 temporarily stores information of control program, etc. The ROM 47 stores control program and/or management information of the terminal 6. The CPU 46 executes the control program. The display circuit 44 implements signal processing to information so that information can be displayed on the display unit 49, e.g., television monitor, etc. The operation unit 45 is operated by user so that operation to select information on the display unit 49, or the like is carried out.

Figure 20:
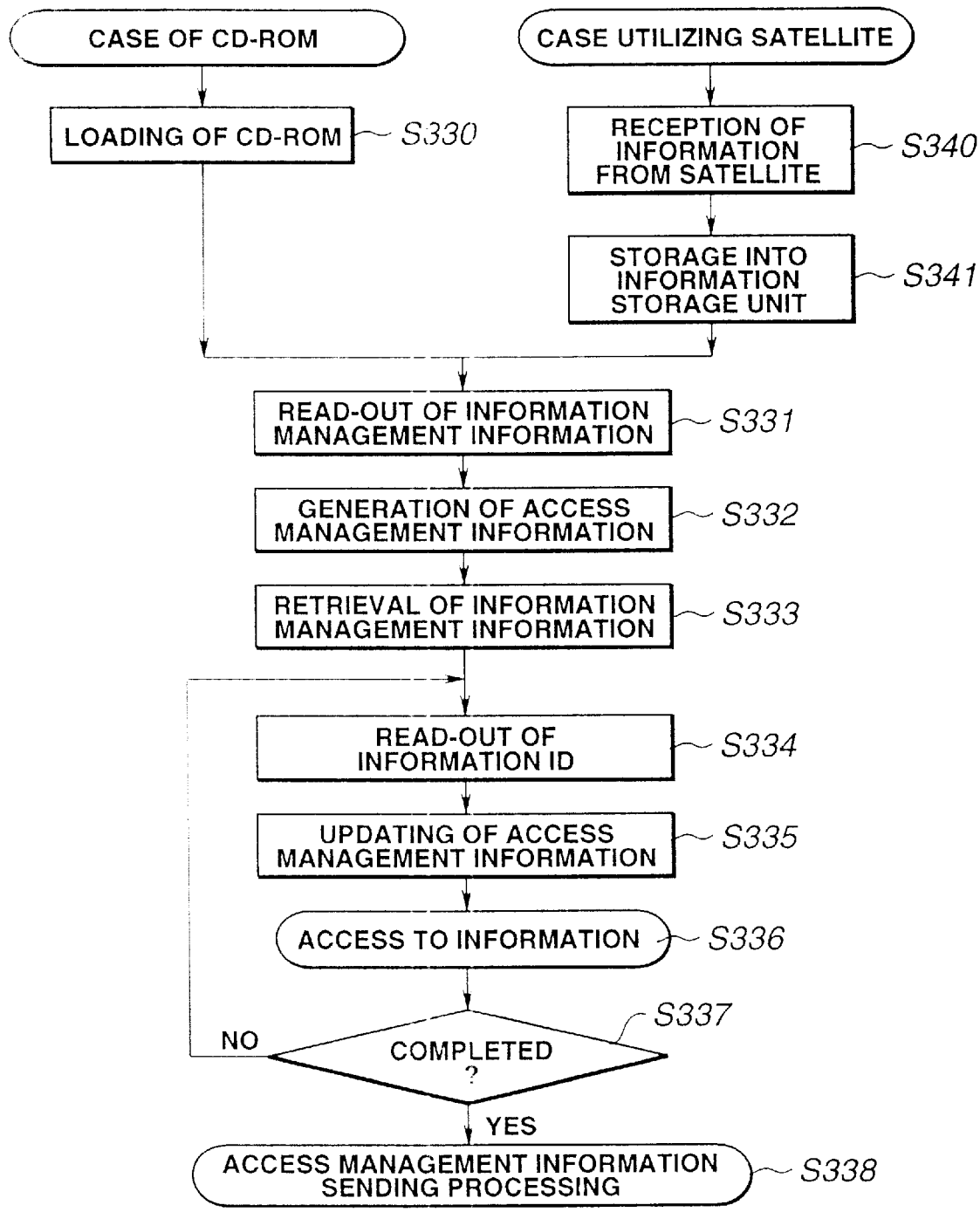
FIG. 20 is a flowchart showing a more practical operation of the terminal of the information providing system of this invention.

The operation of the terminal 6 will now be described with reference to the flowchart shown in FIG. 20. In this embodiment, explanation will be given below in connection with the case where ISDN line or B-ISDN line is used as the communication line.

In the case where user accesses information from the CD-ROM 40a on which vast quantity information such as shopping catalog information, or game software, etc. are recorded, it is possible to retrieve desired information in an interactive form by the information management mechanism of the tree-structure from display of list of the contents of recorded information to read in or execute such information.

Initially, user loads the CD-ROM 40a into the CD-ROM reader 40 (step S330). The CPU 46 executes the control program to copy information management information (directory) which carries out management of the contents of all information recorded (stored) on the CD-ROM 40a into the information storage unit 42.

When user operates the operation unit 45 to issue designation of access of desired information at this stage, the CPU 46 reads out the directory copied into the information storage unit 42 (step S331). Then, the CPU 46 generates access management information to store it into the information storage unit 42 (step S332). Further, the CPU 46 retrieves directory of desired information (step S333). The CPU 46 reads out information ID of desired information included in the access management information stored in the information storage unit 42 (step S334).

The CPU 46 adds access management information as well as access date to the information ID which has been read out to update the access management information stored in the information storage unit 42 (step S335). When access to desired information is carried out (step S336) and is completed (step S337), the CPU 46 sends out access management information (step S338), and displays desired information on the display unit 49.

It is to be noted that in the case of obtaining information through the satellite channel 5 without obtaining information from the CD-ROM 40a, the satellite channel interface 52 receives information through the satellite channel 5 (step S340). The CPU 46 stores the received all information and directory into the information storage unit 42 (step S341). The subsequent operation is similar to that in the case of obtaining information from the CD-ROM 40a.

Figure 21:
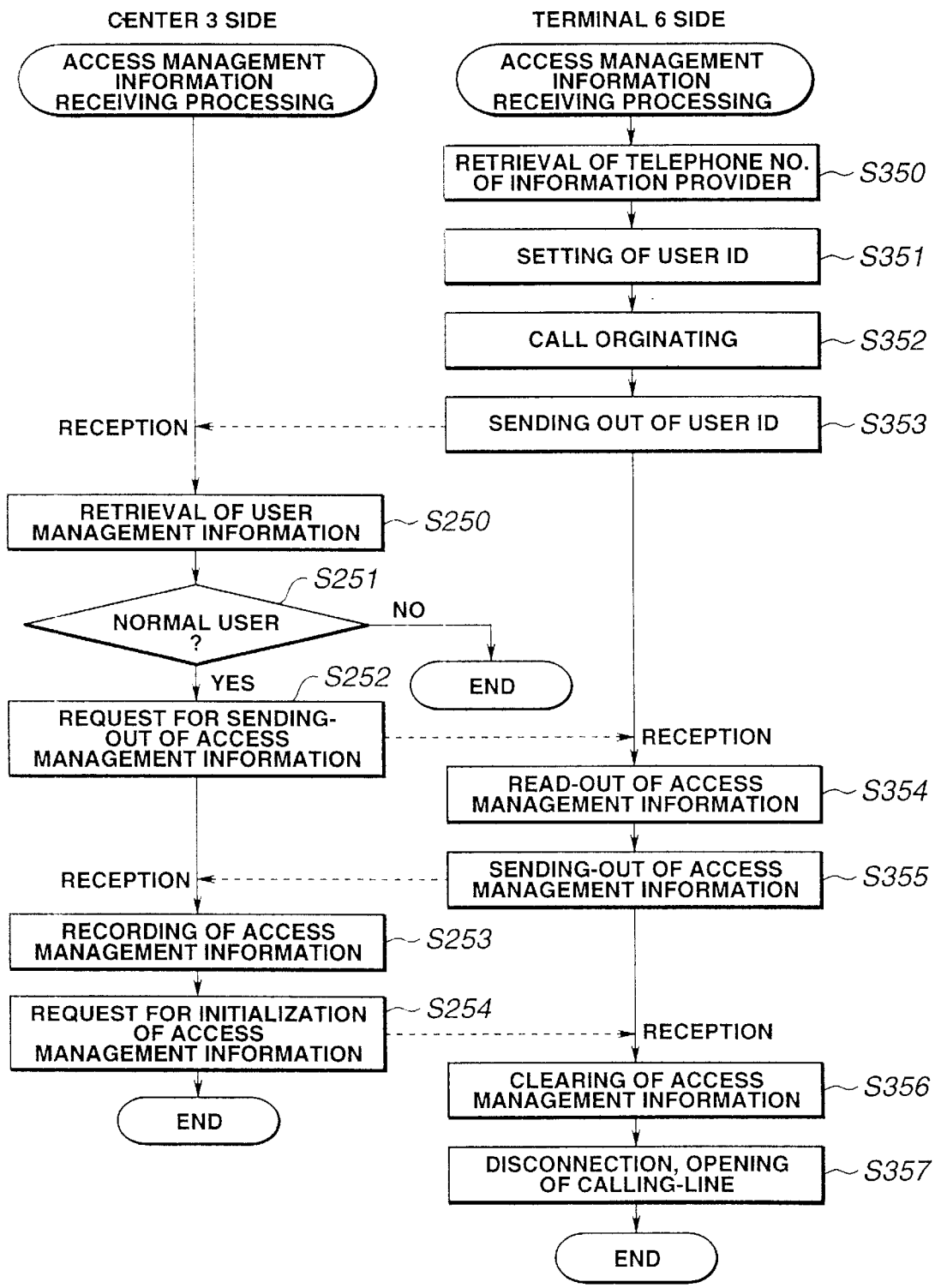
FIG. 21 is a flowchart showing a more practical operations of the center and the terminal of the information providing system of this invention.

The operation of the center 3 and the terminal 6 in the case where access management information is sent from the terminal 6 to the center 3 will now be described with reference to the flowchart shown in FIG. 21.

In the access information sending processing, the CPU 46 of the terminal 6 retrieves telephone number of the information provider from information recorded on the CD-ROM 40a, etc. to copy it into the RAM 43 (step S350). Moreover, the CPU 46 reads out, from the ROM 47, user ID of the terminal 6 utilized at present to copy it into the RAM 43 (step S351).

The CPU 46 originates call to the center 3 on the basis of the telephone number stored in the RAM 43 (step S352). When the communication interface 29 and the communication interface 51 are connected, the CPU 46 adds user ID to user/user information of call setting message through the communication interface 29 and the communication interface 51 to send out it (step S353).

The CPU 24 of the center 3 retrieves user management information stored on the information storage unit 22 on the basis of the received ID (step S250) to judge whether or not this user ID is ID of normal user (step S251). In the case where the user ID is not ID of the normal user, the communication line is cut off (disconnected). Thus, communication processing is completed.

In contrast, in the case where the user ID is ID of the normal user, the CPU 24 sends out a designation (instruction) signal to instruct the terminal 2 to send out access management information therefrom to the terminal 6 through the encipherment/decipherment circuit 23, the converting circuit 28 and the communication interface 29 (step S252). At this time, the CPU 24 retrieves from the user ID where existing access management information exists on the information storage unit 22 to obtain number of the information storage unit and the storage position.

The CPU 46 of the terminal 6 reads out access management information stored in the information storage unit 42 on the basis of the designation (instruction) signal received through the communication interface 51 and the encipherment/decipherment circuit 41 (step S354) to send out access management information to the center 3 via the path in the opposite direction for a second time (step S355).

The CPU 24 of the center 3 stores the received access management information at a predetermined position of the information storage unit 22 (step S253). Thereafter, the CPU 24 sends out, to the terminal 6, an initialization instruction signal for initializing access management information stored in the information storage unit 42 of the terminal 6 (step S254).

When the CPU 46 of the terminal 6 receives the initialization instruction signal, it clears the access management information stored in the information storage unit 42 (step S356) to cut off (disconnect) the communication line. Thus, the communication processing is completed (step S357).

Then, the information provider carries out charging processing of respective information with respect to respective users on the basis of the access management information stored on the information storage unit 22 of the center 3.

It is to be noted that explanation has been given in the above-described embodiment in connection with the case where every time user provides an access to desired information, the access management information is transmitted to the information provider, an approach may be employed to periodically or non-periodically send out, from the center 3, as occasion demands, an instruction signal in order to update the access management information of the center side.

Moreover, while, in the previously described embodiment, the access management information is updated at the terminal 6 to transmit the updated access management information to the center 3, an approach may be employed to update the access management information at the center side to offer (provide) it to user. Namely, in the fifth embodiment, the information storage unit 21 stores multimedia shopping information or game software information. The information storage unit 22 stores charging information every user, management information of user, and access management information such as access past record information indicating access situation, etc.

Figure 22:
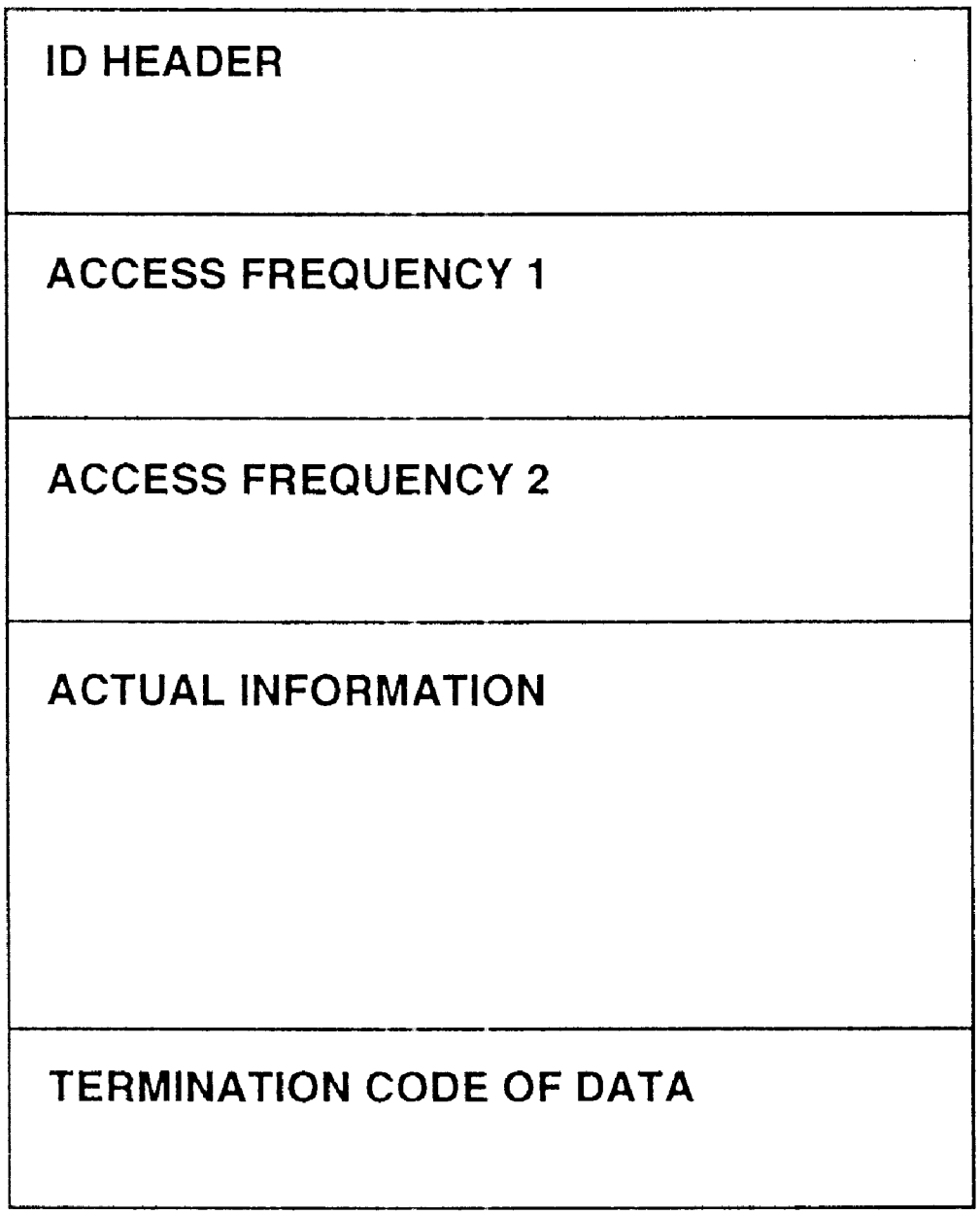
FIG. 22 is a format showing a more practical structure of access frequency information of a further embodiment of the information providing system of this invention.

In this embodiment, the access management information is caused to be a data format as shown in FIG. 22 (actual information shown in FIG. 22 is not included. as the access management information itself). Namely, there is ID header at the leading portion of each data. Registered date of data, kind of data, genre, basic unit of charging, and data quantity, etc. are stored. In the access frequency −1, and the access frequency −2, the numbers of access operations which provide foundation of display data preparation (which will be described later) are stored. As the numbers of access operations, totalized numbers of access operations of all users with respect to plural time intervals are stored. Code indicating termination of data is stored last. For example, the access frequency −1 indicates the totalized number of access operations of one month, and the access frequency −2 indicates the totalized number of access operations of one day.

The ROM 26 of the center 3 stores control program or the management information of the information storage unit 21. The CPU 24 executes the control program. The RAM 25 stores information indicating the present situation.

The information storage unit 42 of the terminal 6 stores information received from the communication line. The RAM 43 copies temporary information of the control program. The ROM 47 stores therein control program or management information of the terminal 6 (information indicating characteristic, such as, for example what feature hardware has, etc.). The CPU 46 executes the control program. The display circuit 44 carries out signal processing of information so that it can be displayed on the display unit 49 such as television monitor, etc.

Figure 23:
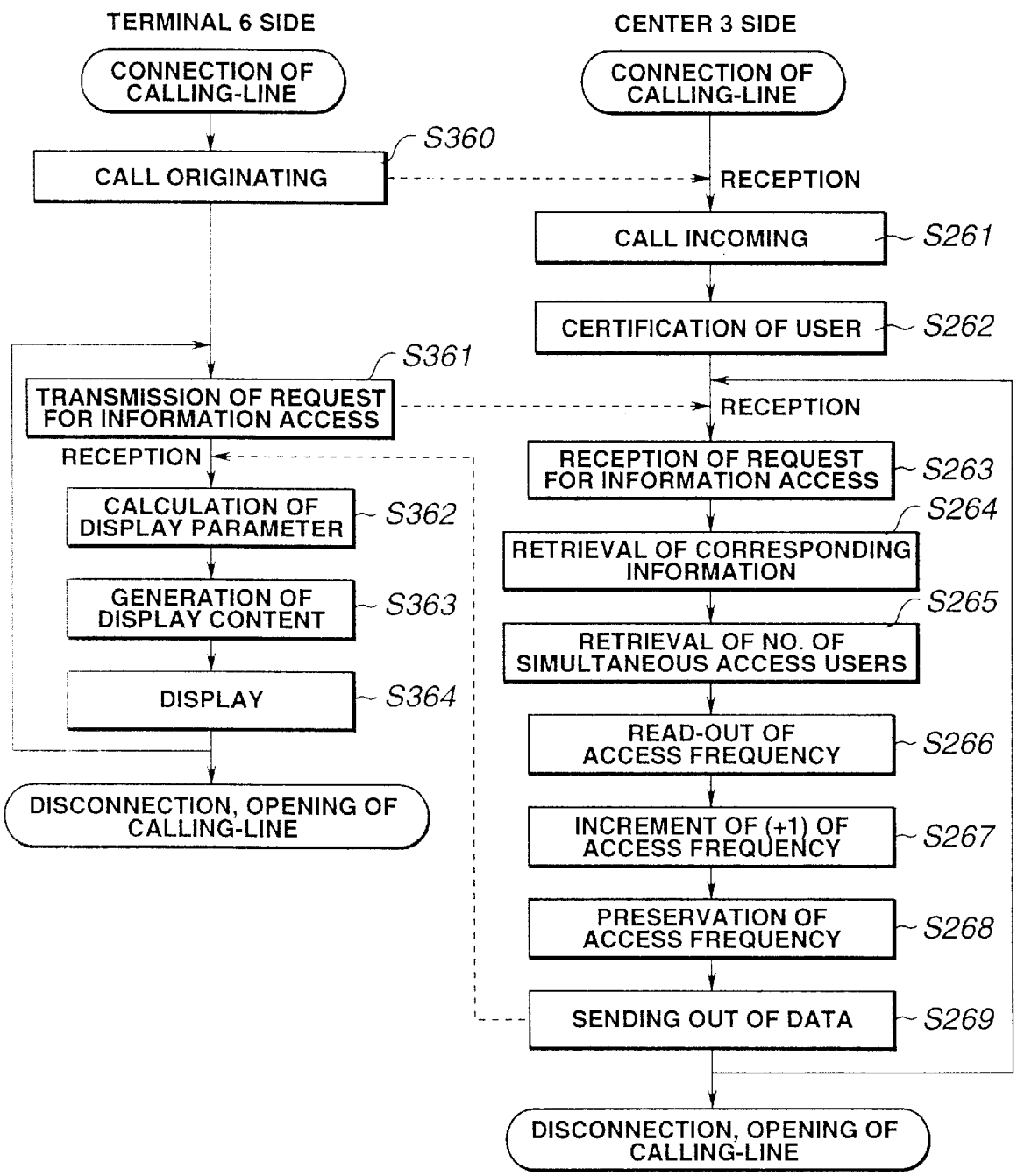
FIG. 23 is a flowchart showing a more practical operation of the further embodiment of the information providing system of this invention.
Figure 24B:
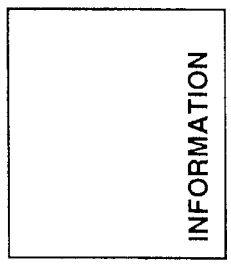
FIG. 24 is an image diagram of access management information every kind displayed on display unit of the further embodiment of the information providing system of this invention.
Figure 24D:
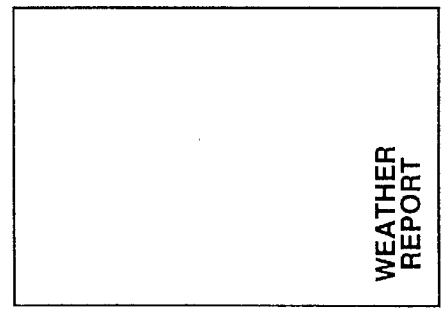
Figure 24A:
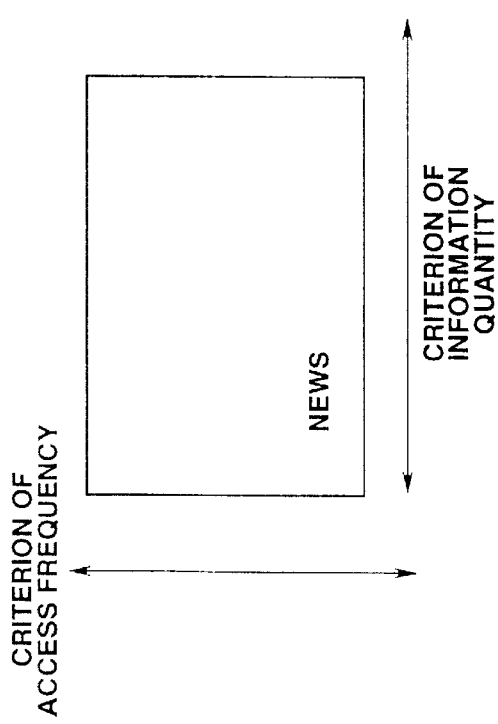
Figure 24C:
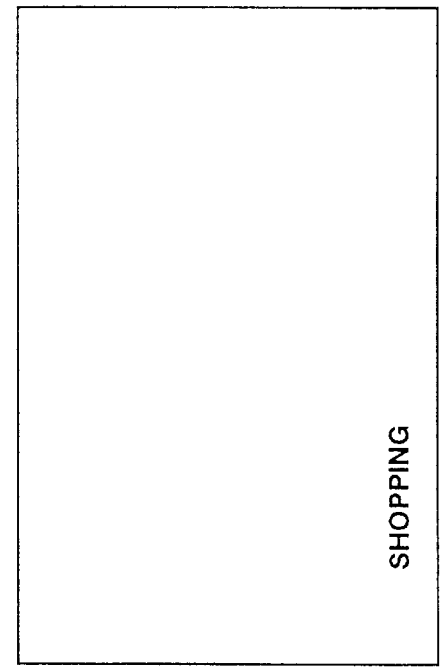

The operation of the center 3 and the terminal 6 constituted as above will now be described with reference to the flowchart of FIG. 23.

Initially, user operates the operation unit 45 to call the center 3 (step S360). By this operation, the communication interface 51 and the communication interface 29 are connected by the communication line 4 (step S261). The CPU 46 reads out parameters necessary for certification stored in the ROM 47 to send them to the center 3 through the communication line. The CPU 24 of the center 3 carries out certification on the basis of the parameters (step S262).

The CPU 46 transmits a request signal which requests desired information to the center 3 through the communication line by operation of user (step S361). The CPU 24 which has received this signal (step S263) retrieves corresponding information from the information storage unit 21 (step S264) to copy it into the RAM 25.

The CPU 24 retrieves the number of users who are providing access to the same information at present (step S265). Further, the CPU 24 reads out the access frequencies 1 and 2 included in the information retrieved at the step S265 (step S266). Values of 1 are respectively added to the access frequencies 1 and 2 thus read out (step S267), and they are stored at predetermined positions of the information storage unit 21 (step S268). Then, the CPU 24 transmits desired information of user and access management information as information such as access frequency, index information and/or information quantity, etc. to the terminal 6 through the communication line in accordance with the previously described format (step S269).

Information displayed on the display unit 49 of the terminal 6 as an initial picture is index information classified every genre (kind). The information thus displayed is obtained by allowing the CPU 46 to carry out calculation of display parameters on the basis of the index information and the frequency information sent from the center 3. With respect to calculation of display parameters, in the case where they are represented by column, the following formulas are applied.

Column parameter h (height)=information quantity/normalization constant*image resolution normalization parameter.

Column parameter 1 (diameter)=frequency information 1/normalization constant 2*image resolution normalization parameter.

In this case, the image resolution normalization parameter is determined from the resolution of the display section and the number of items displayed as the index. With respect to the normalization constant, the normalization constant 1 is determined from the upper limit of information quantity, and the normalization constant 2 is determined from the maximum value of frequency.

The column parameters calculated at the CPU 46 are sent to the display circuit 44. They are displayed on the display unit 49 as the two-dimensional or three-dimensional display. FIG. 24 is an example of the display thereof. Information quantity is indicated in the lateral direction and access frequency is indicated in the longitudinal direction every genre such as (a) news, (b) information, (c) shopping, (d) weather report, etc. In this way, user can relatively simply obtain access management information. As stated above, display is carried out in a manner classified (categorized) every genre. These categories further hierarchical structure. Thus, display parameters are calculated by the CPU 46 every hierarchy, and are processed in such a manner that they can be displayed.

As is clear from the foregoing description, the information providing system to which this invention is applied has such a scheme to access desired information by operation of user from the information recording medium on which information offered from the information provider to user are stored to read out it by information read-out means to transmit management information corresponding to the information thus read out to the information provider by the transmitting means thereafter to store the management information thus sent into the memory means as access management information indicating access situations.

In addition, the information providing system has such a scheme to transmit, to the information provider, by transmitting means, an access instruction signal to instruct access to desired information by operation of user from the information recording medium on which information offered from the information provider to user are stored to read out, by the management information read-out means, access management information indicating access situations of desired information recorded on the information recording medium on the basis of the access instruction signal transmitted by the transmitting means thereafter to transmit the access management information to user by the second transmitting means. Accordingly, it is possible to advantageously efficiently obtain access management information indicating access situations every information that the information provider has offered to the user, etc.

What is claimed is:

1. An information providing system comprising a center for providing information, and at least one terminal for accepting an offer of information from the center, the terminal comprising:

first terminal side memory means which is readable and writable where information is written;

request signal generating means for generating a desired information request signal for requesting the center to transmit desired information;

terminal side transmitting means for transmitting the desired information request signal to the center;

terminal side receiving means for receiving the desired information corresponding to the desired information request signal which has been transmitted from the center;

second terminal side memory means which is readable and writable for storing the received desired information;

updating means for updating the information recorded at the first terminal side memory means using the received desired information stored at the second terminal side memory means so as to change and not merely add to said predetermined information by fully integrating and merging said predetermined information and said received desired information, thereby producing new information, and for storing said new information in said first terminal side memory means and/or said second terminal side memory means;

display means for displaying the received desired information, the center comprising:

center side receiving means for receiving the desired information request signal transmitted from the terminal;

provided information memory means in which information to be offered to the terminal is stored;

desired information retrieving means for extracting information corresponding to the desired information request signal from the provided information memory means;

totalizing means for totalizing the number of access operations by the terminal with respect to the information stored in the provided information memory means to generate totalized information;

totalized information memory means for storing the totalized information; and center side transmitting means for transmitting the extracted desired information to the terminal, the terminal further comprising:

means for generating a hit chart information request signal for requesting the center to transmit hit chart information indicating frequency of utilization operations of information, the terminal side transmitting means being operative to transmit the hit chart information request signal to the center, the center side receiving means being operative to receive the hit chart information request signal, the center further comprising:

processing means for reading out the totalized information from the totalized information memory means in correspondence with the hit chart information request signal to process it into hit chart information, the center side transmitting means being operative to transmit the hit chart information to the terminal.

2. An information providing system as set forth in claim 1, wherein the desired information request signal includes user ID for identifying user and information ID indicating which information corresponds to the desired information.

3. An information providing system as set forth in claim 2, wherein the totalizing means totalizes the numbers of the users every the information ID to thereby generate the totalized information.

4. An information providing system as set forth in claim 3, wherein the processing means generates the hit chart information by arranging the totalized information in order of the number of users who utilize them.

5. An information providing system as set forth in claim 1, wherein the center further comprises:

charging means for carrying out charging processing with respect to request for transmission of the hit chart information from the user.

6. An information providing system as set forth in claim 1, which further comprises an information supply unit for delivering, to the center, information to be offered to the terminal.

7. An information providing system as set forth in claim 6, wherein the information supply unit comprises:

means for generating a marketing information request signal for requesting the center to transmit marketing information arranged or collected for every predetermined characteristics of the user with respect to supplied information.

information source side transmitting means for transmitting the marketing information request signal to the center; and information source side receiving means for receiving the marketing information generated at the center, and wherein the center further comprises:

means for implementing statistical processing to the totalized information for every predetermined characteristics of the user to generate the marketing information and second center side transmitting means for transmitting the marketing information to the information supply unit.

8. An information providing system comprising a center for providing information, and at least one terminal for accepting an offer of information from the center, the terminal comprising:

terminal side memory means which is readable and writable where predetermined information and directory information of the predetermined information are written in advance;

means for reading out corresponding directory information in accordance with an access instruction of user with respect to the predetermined information to generate access management information including information relating to past record of access with respect to the predetermined information;

updating means for updating the access management information using the times access to the predetermined information is carried out so as to change and not merely add to said predetermined information by fully integrating and merging said predetermined information and said updating information, thereby producing new information, and for storing said new information in said terminal side memory means; and terminal side transmitting means for transmitting the updated access management information to the center, the center comprising:

center side receiving means for receiving the access management information transmitted from the terminal;

center side memory means for storing the access management information in a manner caused to be in correspondence with user ID for identifying user; and charging means for implementing charging processing to the user on the basis of the access management information stored at the center side memory means.

9. An information providing system as set forth in claim 8,
wherein the access management information consists of access past record information including information indicating the number of access operations and access time, and personal characteristic information including information indicating distinction of sex and age of user.

10. An information providing system as set forth in claim 9,
wherein the access past record information in the access management information includes information indicating the numbers of access operations and access times with respect to respective information in the predetermined information.

11. An information providing system as set forth in claim 8,
wherein the center further comprises:
center side transmitting means which generates a request signal for requesting the terminal to transmit the access management information to the center,
wherein the terminal further comprises:
terminal side receiving means for receiving the request signal transmitted from the center,
the terminal side transmitting means being operative to transmit the updated access management information in accordance with the request signal.

12. An information providing system as set forth in claim 11,
wherein the center side transmitting means transmits the request signal every time the user provides access to information.

13. An information providing system as set forth in claim 11,
wherein the center side transmitting means periodically or non-periodically transmits the request signal to the terminal.

14. An information providing system comprising a center for providing information, and at least one terminal for accepting an offer of information from the center,
wherein the center comprises:
center side memory means having a memory means whish is readable and writable and has information written in advance for storing information to be offered to the terminal along with access management information including access past record information relating to every user with respect to the information;
center side receiving means for receiving an access request signal for requesting access of predetermined information transmitted from the terminal;
means for taking out, from the center side memory means, information corresponding to the access request signal and access management information of the information;
means for calculating access past record of all users with respect to the information which has been taken out to add access past record of this time to the access past record of the all users to generate updated access management information of the all users; and
center side transmitting means for transmitting, to the terminal, the information corresponding to the access request signal and the updated access management information of the all users,
wherein the terminal comprises;
terminal side transmitting means for transmitting the access request signal to the center;
terminal side receiving means for receiving the information corresponding to the access request signal and the updated access management information of the all users;
updating means for updating the access management information using the updated access management information so as to change and not merely add to said information written in said terminal memory means by fully integrating and merging said written information and said access management information, thereby producing new information, and for storing said new information in said terminal memory means,
means which calculates display parameters for graphically displaying access situations of the all users on the basis of the updated access management information of the all users; and
display means for generating display content by using the display parameters to display the display content on a display.

15. An information providing system as set forth in claim 14,
wherein the access past record includes information relating to the number of access operations of user with respect to predetermined information.

16. An information providing system as set forth in claim 15,
wherein the access management information includes identification (ID) header, the ID header including information relating to kind of information accompanied by the access management information.

17. An information providing system as set forth in claim 15,
wherein the access management information of the all users includes information relating to totalization of the numbers of access operations of corresponding information of the all users with respect to a plurality of time intervals.

* * * * *